US012550026B2

(12) United States Patent
Jung et al.

(10) Patent No.: US 12,550,026 B2
(45) Date of Patent: Feb. 10, 2026

(54) METHOD AND APPARATUS FOR SUPPORTING VOICE CALL SERVICE IN NEXT-GENERATION MOBILE COMMUNICATION SYSTEM

(71) Applicant: Samsung Electronics Co., Ltd., Suwon-si (KR)

(72) Inventors: Sangyeob Jung, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 685 days.

(21) Appl. No.: 17/754,553

(22) PCT Filed: Sep. 24, 2020

(86) PCT No.: PCT/KR2020/013008
§ 371 (c)(1),
(2) Date: Apr. 5, 2022

(87) PCT Pub. No.: WO2021/071147
PCT Pub. Date: Apr. 15, 2021

(65) Prior Publication Data
US 2022/0418034 A1  Dec. 29, 2022

(30) Foreign Application Priority Data

Oct. 7, 2019 (KR) .................. 10-2019-0123816
Nov. 6, 2019 (KR) .................. 10-2019-0141263

(51) Int. Cl.
*H04W 36/14* (2009.01)
*H04W 36/00* (2009.01)
(Continued)

(52) U.S. Cl.
CPC ...... *H04W 36/144* (2023.05); *H04W 36/0011* (2013.01); *H04W 36/14* (2013.01);
(Continued)

(58) Field of Classification Search
CPC .................................................. H04W 36/114
See application file for complete search history.

(56) References Cited

U.S. PATENT DOCUMENTS

2013/0295939 A1* 11/2013 Wegmann ............. H04W 76/19
455/450
2017/0134994 A1  5/2017 Chinthalapudi et al.
(Continued)

FOREIGN PATENT DOCUMENTS

KR  10-2021-0017991 A  2/2021
KR  10-2021-0017992 A  2/2021
(Continued)

OTHER PUBLICATIONS

International Search Report and Written Opinion of the International Searching Authority dated Jan. 12, 2021, in connection with International Application No. PCT/KR2020/013008, 10 pages.
(Continued)

*Primary Examiner* — Jason E Mattis

(57) ABSTRACT

The present disclosure relates to a communication technique for convergence between an IoT technology and a 5G communication system for supporting a higher data transmission rate than a 4G system, and a system thereof. The present disclosure may be applied to intelligence services (for example, smart homes, smart buildings, smart cities, smart cars or connected cars, healthcare, digital education, retail businesses, security and safety related services, etc.) on the basis of a 5G communication technology and an IoT-related technology. In addition, the purpose of the present disclosure is to provide an efficient voice call method in a next-generation mobile communication system. Furthermore, the present disclosure may provide an operation method of a terminal in a wireless communication system, and an apparatus performing same, the method comprising the steps of: receiving a mobility-related message for han-
(Continued)

dover from a first radio access technology (RAT) supporting new radio (NR) to a second RAT; on the basis of the mobility-related message, identifying whether a mobility procedure to the second RAT fails; in case that the failure in the mobility procedure is identified, identifying whether the mobility-related message includes an indicator; in case that the mobility-related message includes the indicator, selecting a cell of the second RAT; and performing a radio resource control (RRC) idle operation by the cell of the second RAT.

19 Claims, 17 Drawing Sheets

(51) Int. Cl.
  *H04W 36/32* (2009.01)
  *H04W 76/19* (2018.01)
  *H04W 76/27* (2018.01)
(52) U.S. Cl.
  CPC ......... *H04W 36/322* (2023.05); *H04W 76/19* (2018.02); *H04W 76/27* (2018.02)

(56) References Cited

U.S. PATENT DOCUMENTS

| | | | | |
|---|---|---|---|---|
| 2020/0275340 | A1* | 8/2020 | Kim | H04W 4/70 |
| 2021/0329521 | A1* | 10/2021 | Araujo | H04W 36/08 |
| 2022/0322173 | A1* | 10/2022 | Chang | H04W 36/305 |
| 2022/0345962 | A1* | 10/2022 | Hori | H04W 36/144 |
| 2023/0171655 | A1* | 6/2023 | Chen | H04W 36/00 370/331 |

FOREIGN PATENT DOCUMENTS

| | | |
|---|---|---|
| KR | 10-2021-0017993 A | 2/2021 |
| KR | 10-2021-0017998 A | 2/2021 |

OTHER PUBLICATIONS

ETSI TS 138 331 V15.7.0 (Oct. 2019), 5G; NR; Radio Resource Control (RRC); Protocol specification (3GPP TS 38.331 version 15.7.0 Release 15), Oct. 2019, 525 pages.

3GPP TS 23.502 V16.2.0 (Sep. 2019), Technical Specification, 3rd Generation Partnership Project; Technical Specification Group Services and System Aspects; Procedures for the 5G System (5GS); Stage 2 (Release 16), Sep. 2019, 524 pages.

3GPP TS 38.304 V15.5.0 (Sep. 2019), Technical Specification, 3rd Generation Partnership Project; Technical Specification Group Radio Access Network; NR; User Equipment (UE) procedures in Idle mode and RRC Inactive state (Release 15), Sep. 2019, 29 pages.

Qualcomm Incorporated et al., "EPS Fallback Issues," R2-1909478, 3GPP TSG-RAN2#107, Prague, Czech, Aug. 26-30, 2019, 5 pages.

Qualcomm Incorporated, "Introduction of voice fallback indication," R2-1909479, 3GPP TSG-RAN WG2 Meeting #107, Prague, Czech Republic, Aug. 26-30, 2019, 14 pages.

Qualcomm Incorporated, "Introduction of voice fallback indication," R2-1909480, 3GPP TSG-RAN WG2 Meeting #107, Prague, Czech Republic, Aug. 26-30, 2019, 18 pages.

Samsung, "CR on UE behavior with E-UTRA cell selection upon mobility from NR failure for enhanced EPS voice fallback," R2-2008007, 3GPP TSG-RAN WG2 Meeting #111-e, Online, Aug. 17-28, 2020, 4 pages.

Samsung, "CR on UE behavior with E-UTRA cell selection upon mobility from NR failure for enhanced EPS voice fallback," 3GPP TSG-RAN WG2 Meeting #111-e, R2-2008525, Online, Aug. 17-28, 2020, 4 pages.

Office Action dated Nov. 17, 2025, in connection with Korean Application No. 10-2020-0124215, 8 pages.

* cited by examiner

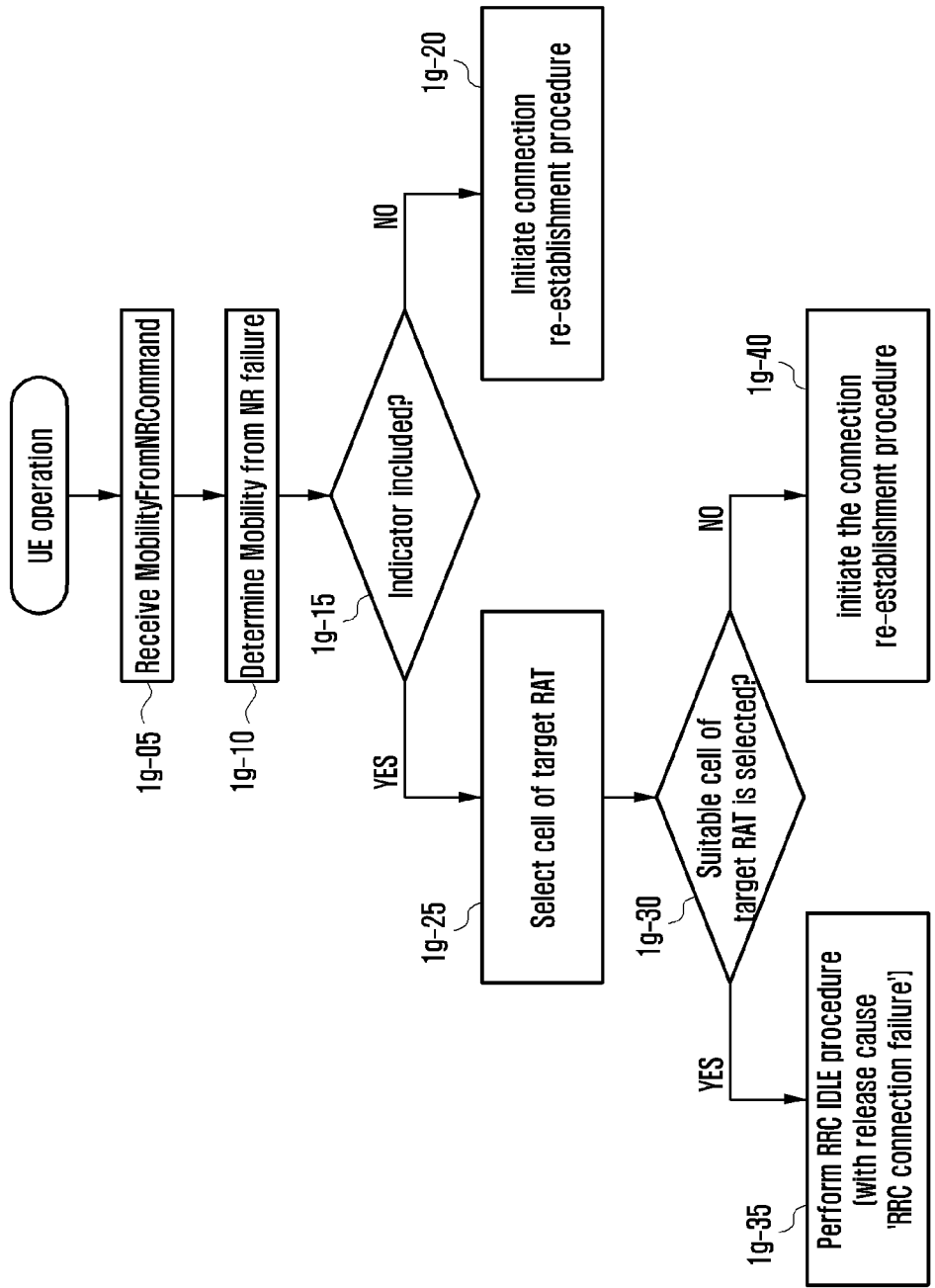

METHOD AND APPARATUS FOR SUPPORTING VOICE CALL SERVICE IN NEXT-GENERATION MOBILE COMMUNICATION SYSTEM

CROSS-REFERENCE TO RELATED APPLICATIONS

This application is a 371 National Stage of International Application No. PCT/KR2020/013008, filed Sep. 24, 2020, which claims priority to Korean Patent Application No. 10-2019-0123816, filed Oct. 7, 2019, and Korean Patent Application No. 10-2019-0141263, filed Nov. 6, 2019, the disclosures of which are herein incorporated by reference in their entirety.

BACKGROUND

1. Field

The disclosure relates to operations of a UE and a base station in a mobile communication system. The disclosure relates to a method and an apparatus for supporting a voice call service in a next-generation mobile communication system. The disclosure relates to a method and an apparatus for supporting a voice call service through circuit-switch fall back (CSFB) in a next-generation mobile communication system. In addition, the disclosure relates to a method and an apparatus for supporting a closed access group (CAG) in a wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" communication system or a "Post LTE" system. The 5G communication system is considered to be implemented in ultrahigh frequency (mmWave) bands (e.g., 60 GHz bands) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems. In addition, in 5G communication systems, development for system network improvement is under way based on advanced small cells, cloud radio access networks (cloud RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology (IT) services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (cloud RAN) as the above-described big data processing technology may also be considered an example of convergence of the 5G technology with the IoT technology.

SUMMARY

A technical problem to be solved in an embodiment of the disclosure is to provide improved operations of a UE and a base station in a mobile communication system. In addition, a technical problem to be solved in an embodiment of the disclosure is to provide a method and an apparatus for supporting a voice call service in a next-generation mobile communication system. In addition, a technical problem to be solved in an embodiment of the disclosure is to provide a method and an apparatus for supporting a voice call service through a circuit-switched fallback in a next-generation mobile communication system. In addition, a technical problem to be solved in an embodiment of the disclosure is to provide a method and an apparatus for supporting a cell reselection process regarding a CAG.

An embodiment of the disclosure may provide a method for operating a UE in a wireless communication system, the method including: receiving a mobility-related message for handover from a first radio access technology (RAT) supporting new radio (NR) to a second RAT; identifying whether a mobility procedure to the second RAT fails, based on the mobility-related message; in case that the failure of the mobility procedure is identified, identifying whether the mobility-related message includes an indicator; in case that the mobility-related message includes the indicator, selecting a cell of the second RAT; and performing a radio resource control (RRC) idle operation in the cell of the second RAT.

Furthermore, an embodiment of the disclosure may provide a method for operating a source base station in a wireless communication system, the method including: initiating a handover procedure related to an evolved packet service (EPS) fallback for supporting an IP multimedia subsystem (IMS) service; and transmitting, to a UE, a mobility-related message for handover from a first radio access technology (RAT) supporting new radio (NR) to a second RAT, wherein, in case that an indicator is included in the mobility-related message and a failure of a mobility procedure to the second RAT is identified based on the mobility-related message, a cell of the second RAT is selected, and a procedure of re-establishing a connection to the source base station is not performed.

Furthermore, an embodiment of the disclosure may provide a UE of a wireless communication system, the UE including: a transceiver; and a controller configured to receive a mobility-related message for handover from a first radio access technology (RAT) supporting new radio (NR) to a second RAT through the transceiver, identify whether a mobility procedure to the second RAT fails based on the mobility-related message, identify whether the mobility-related message includes an indicator in case that the failure of the mobility procedure is identified, select a cell of the second RAT in case that the mobility-related message includes the indicator, and control to perform a radio resource control (RRC) idle operation in the cell of the second RAT.

Furthermore, an embodiment of the disclosure may provide a source base station of a wireless communication system, the source base station including: a transceiver; and a controller configured to initiate a handover procedure related to an evolved packet service (EPS) fallback for supporting an IP multimedia subsystem (IMS) service, and control so as to transmit, to a UE, a mobility-related message for handover from a first radio access technology (RAT) supporting new radio (NR) to a second RAT through the transceiver, wherein in case that an indicator is included in the mobility-related message and a failure of the mobility procedure to the second RAT is identified based on the mobility-related message, a cell of the second RAT is selected, and a procedure of re-establishing a connection to the source base station is not performed.

The technical subjects pursued in embodiments of the disclosure may not be limited to the above mentioned technical subjects, and other technical subjects which are not mentioned may be clearly understood, through the following descriptions, by those skilled in the art to which the disclosure pertains.

Various embodiments of the disclosure may provide improved operations of a UE and a base station in a mobile communication system. In addition, various embodiments of the disclosure may provide a method and an apparatus for supporting a voice call service in a next-generation mobile communication system. In addition, various embodiments of the disclosure may provide a method and an apparatus for supporting a voice call service through a circuit-switched fallback in a next-generation mobile communication system. In addition, various embodiments of the disclosure may provide a method and an apparatus for supporting a cell reselection process regarding a CAG.

BRIEF DESCRIPTION OF THE DRAWINGS

FIG. 1G illustrates an operation of a UE in case that receiving a mobility-related message from an NR base station according to an embodiment of the disclosure;

DETAILED DESCRIPTION

Figure 1A:
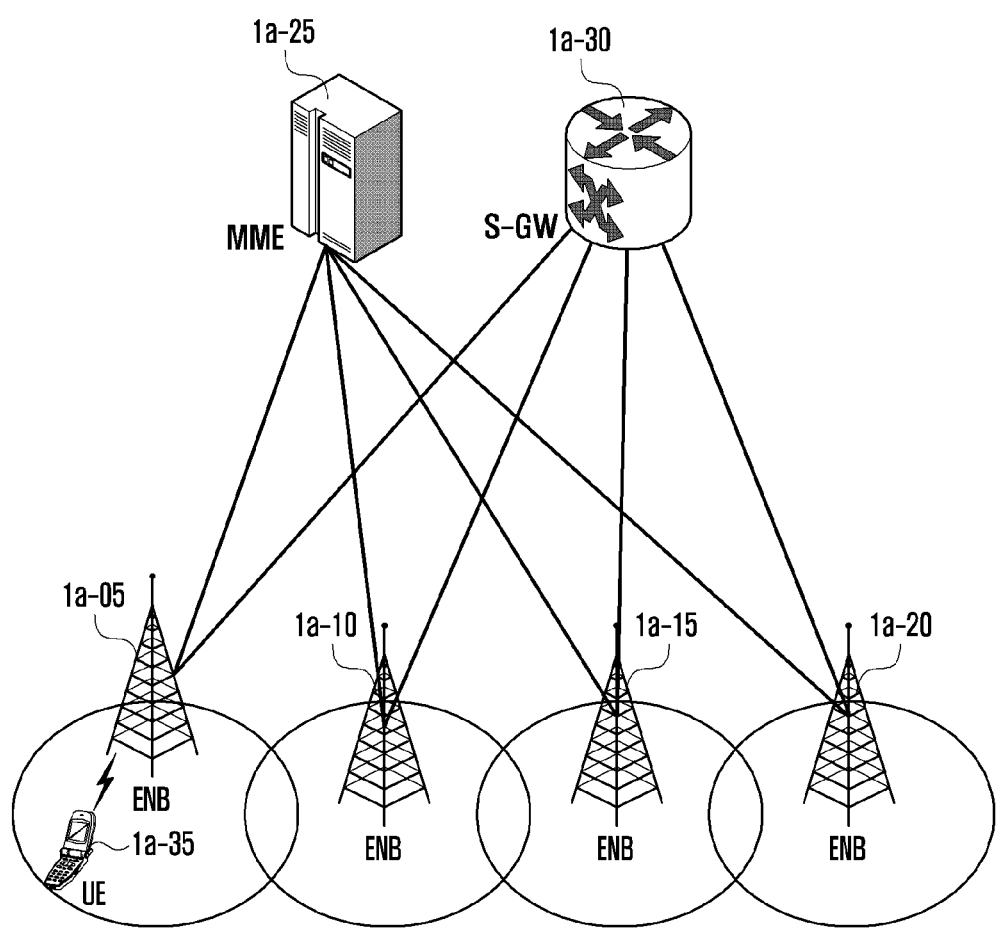
FIG. 1A illustrates the structure of an LTE system according to an embodiment of the disclosure.

Hereinafter, exemplary embodiments of the disclosure will be described in detail with reference to the accompanying drawings. It should be noted that, in the drawings, the same or like elements are designated by the same or like reference signs as much as possible. Further, a detailed description of known functions or configurations that may make the subject matter of the disclosure unclear will be omitted.

In describing embodiments in the specification, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

<First Disclosure>

FIG. 1A illustrates the structure of an LTE system according to an embodiment of the disclosure.

Referring to FIG. 1A, a radio access network of an LTE system may include next-generation base stations (evolved node Bs, hereinafter eNBs, node Bs, or base stations) 1a-05, 1a-10, 1a-15, and 1a-20, a mobility management entity (MME) 1a-25, and a serving gateway (S-GW) 1a-30. A user equipment (hereinafter UE or terminal) 1a-35 may access an external network through the eNBs 1a-05 to 1a-20 and S-GW 1a-30.

In FIG. 1A, the eNBs 1a-05, 1a-10, 1a-15, and 1a-20 may correspond to an existing node B of a universal mobile telecommunication system (UMTS). The eNB 1a-05 may be connected to the UE 1a-35 through a radio channel, and may perform a more complicated role than the existing node B. In the LTE system, since all user traffic pertaining to real-time service, such as voice over IP (VoIP), via the Internet protocol, may be serviced through a shared channel. Therefore, a device that performs scheduling by collecting state information, such as buffer states, available transmit power states, and channel states of UEs, is required, and the eNBs 1a-05, 1a-10, 1a-15, and 1a-20 may be in charge of this function of the device.

One eNB may control multiple cells. For example, in order to implement a transmission rate of 100 Mbps, the LTE system may use orthogonal frequency division multiplexing (OFDM) as a radio access technology in the bandwidth of 20 MHz. In addition, the LTE system may adopt an adaptive modulation and coding (hereinafter referred to as AMC) scheme for determining a modulation scheme and a channel coding rate based on the channel state of the UE. The S-GW 1a-30 is a device for providing a data bearer, and may generate or remove a data bearer under the control of the MME 1a-25. The MME 1a-25 is a device capable of being in charge of various control functions in addition to a mobility management function for the UE, and may be connected to multiple base stations.

Figure 1B:
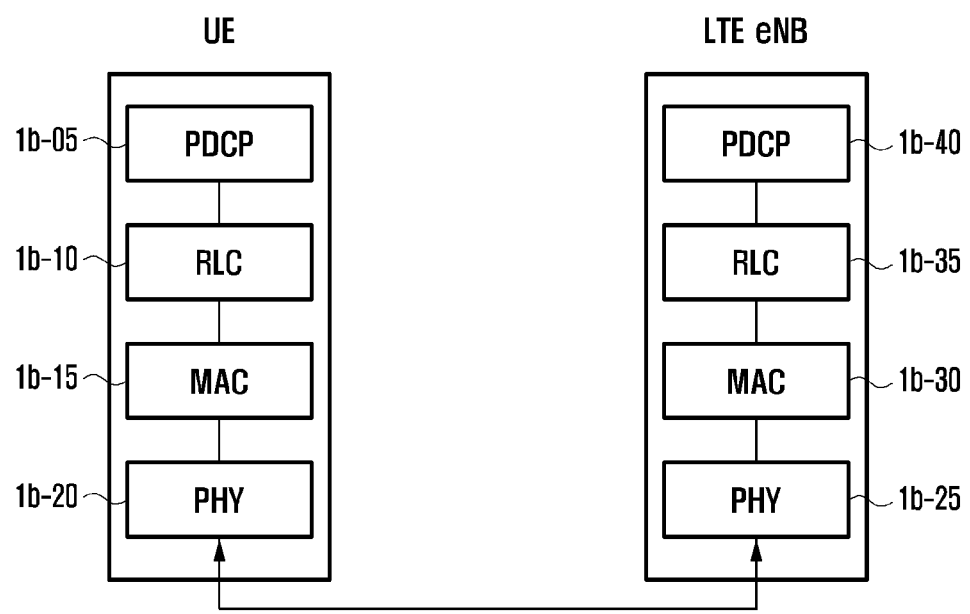
FIG. 1B illustrates a radio protocol structure in an LTE system according to an embodiment of the disclosure.

FIG. 1B illustrates a radio protocol structure in an LTE system according to an embodiment of the disclosure.

Referring to FIG. 1B, the radio protocol of the LTE system may include packet data convergence protocols (PDCPs) 1b-05 and 1b-40, radio link controls (RLCs) 1b-10 and 1b-35, and medium access controls (MACs) 1b-15 and 1b-30, in a UE and an eNB, respectively. In various embodiments of the disclosure, PDCPs 1b-05 and 1b-40 may be interchangeably used with the PDCP layer or PDCP entity, RLCs 1b-10 and 1b-35 may be interchangeably used with the RLC layer or RLC entity, and MACs 1b-15 and 1b-30 may be interchangeably used with the MAC layer or MAC entity.

The PDCPs 1b-05 and 1b-40 may be in charge of operations, such as IP header compression/restoration. The main functions of PDCPs may be summarized as follows.

Header compression and decompression: ROHC only
Transfer of User Data
In-sequence delivery of upper layer PDUs at PDCP re-establishment procedure for RLC AM
Sequence reordering (for split bearers in DC (only support for RLC AM): PDCP PDU routing for transmission and PDCP PDU reordering for reception)
Duplicate detection of lower layer SDUs at a PDCP re-establishment procedure for RLC AM
Retransmission of PDCP SDUs at handover and, for split bearers in DC, of PDCP PDUs at PDCP data-recovery procedure, for RLC AM)
Ciphering and Deciphering
Timer-based SDU discard in uplink The radio link controls (RLCs) 1b-10 and 1b-35 may perform ARQ operation by reconfiguring a PDCP packet data unit (PDU) at an appropriate size. The main functions of RLC are summarized below.

Data transfer (Transfer of upper layer PDUs)
ARQ function (Error correction through ARQ (only for AM data transfer))
Concatenation, segmentation, and reassembly of RLC SDUs (only for UM and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC Re-Establishment The MACs 1b-15 and 1b-30 may be connected to multiple RLC layer devices configured in one UE, and may perform an operation of multiplexing RLC PDUs to MAC PDUs and de-multiplexing RLC PDUs from MAC PDUs. The main functions of MACs may be summarized as follows.

Mapping between logical channels and transport channels
Multiplexing/de-multiplexing of MAC SDUs belonging to one or different logical channels into/from transport blocks (TB) delivered to/from the physical layer on transport channel s
Scheduling information reporting
Error correction through hybrid automatic repeat request (HARD)
Priority handling between logical channels of one UE
Priority handling between UEs by means of dynamic scheduling
MBMS service identification
Transport format selection
Padding Physical layers 1b-20 and 1b-25 may perform operations of channel coding and modulating upper layer data, forming the upper layer data into an OFDM symbol, transmitting the OFDM symbol through a radio channel, or of demodulating an OFDM symbol received through a radio channel, channel-decoding the OFDM symbol, and transmitting the OFDM symbol to an upper layer.

Figure 1C:
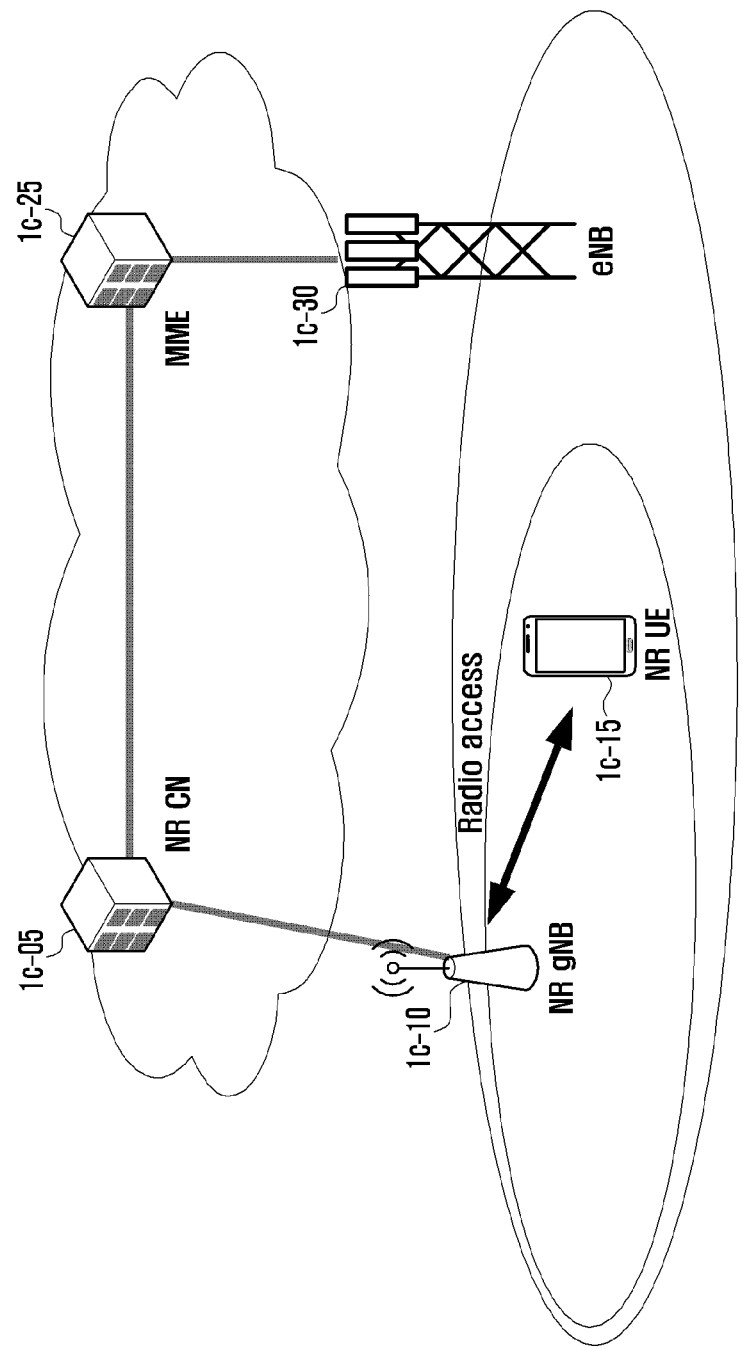
FIG. 1C illustrates the structure of a next-generation mobile communication system according to an embodiment of the disclosure.

FIG. 1C illustrates the structure of a next-generation mobile communication system according to an embodiment of the disclosure.

Referring to FIG. 1C, a radio access network of a next-generation mobile communication system (hereinafter referred to as NR or 5G) may include a next-generation base station (new radio node B (hereinafter referred to as an NR gNB, NR base station, or NR NB) 1c-10 and a next-generation radio core network (new radio core network (NR CN) 1c-05. A next generation radio user equipment (a new radio user equipment, NR UE, or terminal) 1c-15 may access an external network via the NR gNB 1c-10 and the NR CN 1c-05.

In FIG. 1C, the NR gNB 1c-10 may correspond to an evolved node B (eNB) of the existing LTE system. The NR gNB is connected to the NR UE 1c-15 via a radio channel, and may provide an excellent service as compared to the existing node B. In the next-generation mobile communication system, all types of user traffic may be serviced through a shared channel. Therefore, there is a need for a device for performing scheduling by collecting state information, such as buffer states, available transmission power states, and channel states of UEs, and the NR NB 1c-10 may be in charge of this function of the device. One NR gNB may control multiple cells. In order to implement ultra-high speed data transmission as compared to the current LTE, the next-generation mobile communication system may apply the current maximum bandwidth or more. Further, the next-generation mobile communication system may additionally employ beamforming technology using orthogonal frequency division multiplexing (OFDM) as a radio access technology. In addition, the next-generation mobile communication system may adopt an adaptive modulation and coding (hereinafter, referred to as AMC) scheme for determining a modulation scheme and a channel coding rate based on the channel state of a UE.

The NR CN 1c-05 may perform functions, such as mobility support, bearer configuration, and quality of service (QoS) configuration. The NR CN 1c-05 is a device that is in charge of various control functions in addition to a mobility management function for a UE, and may be connected to multiple base stations. In addition, the next-generation mobile communication system may also operate in conjunction with the existing LTE system, and the NR CN 1c-05 may be connected to an MME 1c-25 via a network interface. The MME 1c-25 may be connected to an eNB 1c-30, that is, to the existing base station.

Figure 1D:
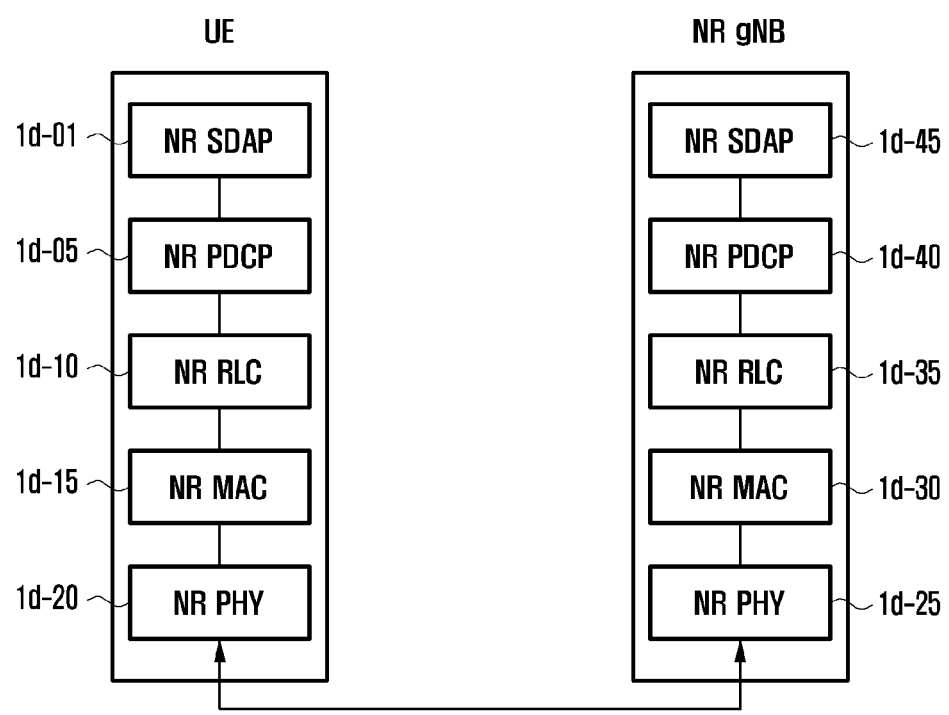
FIG. 1D illustrates a radio protocol structure of a next-generation mobile communication system according to an embodiment of the disclosure.

FIG. 1D illustrates a radio protocol structure of a next-generation mobile communication system according to an embodiment of the disclosure.

Referring to FIG. 1D, the radio protocol of the next-generation mobile communication system includes NR service data adaptation protocol (SDAPs) 1d-01 and 1d-45, NR PDCPs 1d-05 and 1d-40, NR RLCs 1d-10 and 1d-35, NR MACs 1d-15 and 1d-30, and NR PHYs 1d-20 and 1d-25, respectively, in a UE and an NR base station. In various embodiments of the disclosure, SDAPs 1d-01 and 1d-45 may be interchangeably used with the SDAP layer or SDAP entity, NR PDCPs 1d-05 and 1d-40 may be interchangeably used with the NR PDCP layer or NR PDCP entity, NR RLCs 1d-10 and 1d-35 may be interchangeably used with the NR RLC layer or NR RLC entity, and NR MACs 1d-15 and 1d-30 may be interchangeably used with the NR MAC layer or NR MAC entity.

The main functions of the NR SDAPs 1d-01 and 1d-45 may include some of the following functions.

Transfer of User Plane Data
Mapping between a QoS flow and a data bearer (DRB) for both downlink (DL) and uplink (UL)
Marking QoS flow ID in both DL and UL packets
Mapping reflective QoS flow to DRB for the UL SDAP PDUs For the SDAP layer device, the UE may be configured with as to whether or not use the header of the SDAP layer device or the function of the SDAP layer device (or new layer device) for each PDCP layer device, for each bearer, or for each logical channel through a radio resource control (RRC) message. When the SDAP header is configured, a non-access stratum (NAS) quality of service (QoS) reflective configuration 1-bit indicator (NAS reflective QoS) and an access stratum (AS) QoS reflective configuration 1-bit indicator (AS reflective QoS) of the SDAP header are used to instruct the UE to enable updating or reconfiguration of the mapping information relating to the QoS flow of uplink and downlink and data bearer. The SDAP header may include QoS flow ID information indicating QoS. The QoS information may be used as data processing priority, scheduling information, etc., in order to support a smooth service.

The main functions of the NR PDCPs 1d-05 and 1d-40 may include some of the following functions.

Header compression and decompression (ROHC only)
    Transfer of user data
    In-sequence delivery of upper layer PDUs
    Out-of-sequence delivery of upper layer PDUs
    PDCP PDU reordering for reception
    Duplicate detection of lower layer SDUs
    Retransmission of PDCP SDUs
    Ciphering and deciphering
    Timer-based SDU discard in uplink In the description above, the reordering function of the NR PDCP device may refer to a function of sequentially reordering PDCP PDUs, received from a lower layer, based on a PDCP sequence number (SN). The reordering function of the NR PDCP device may include a function of transmitting data to an upper layer in the reordered sequence, a function of directly transmitting data to an upper layer without taking the sequence into consideration, a function of reordering the sequence and recording missing PDCP PDUs, a function of providing a state report on the missing PDCP PDUs to a transmission side, and a function of requesting retransmission of the missing PDCP PDUs.

The main functions of the NR RLCs 1d-10 and 1d-35 may include some of the following functions.

Transfer of upper layer PDUs
    In-sequence delivery of upper layer PDUs
    Out-of-sequence delivery of upper layer PDUs
    Error Correction through ARQ
    Concatenation, segmentation and reassembly of RLC SDUs
    Re-segmentation of RLC data PDUs
    Reordering of RLC data PDUs
    Duplicate detection
    Protocol error detection
    RLC SDU discard
    RLC re-establishment In the description above, the in-sequence delivery function of the NR RLC device may refer to a function of transmitting RLC SDUs, which are received from a lower layer, to an upper layer in a sequence of reception. When one RLC SDU is originally segmented into multiple RLC SDUs and received, the in-sequence delivery function of the NR RLC device may include a function of reassembling and transmitting the multiple RLC SDUs.

The in-sequence delivery function of the NR RLC device may include a function of reordering the received RLC PDUs based on an RLC SN or PDCP SN, reordering the sequence, and recording missing RLC PDUs, providing a state report on the missing RLC PDUs to a transmission side, and requesting retransmission of the missing RLC PDUs.

The in-sequence delivery function of the NR RLC devices 1d-10 and 1d-35 may include a function of sequentially transmitting only RLC SDUs prior to the missing RLC SDU to an upper layer if an RLC SDU is missing. Further, the in-sequence delivery function of the NR RLC device may include sequentially transmitting all the RLC SDUs received before a timer starts to an upper layer if a predetermined timer expires even if there is a missing RLC SDU. In addition, the in-sequence delivery function of the NR RLC device may include sequentially transmitting all RLC SDUs received so far to an upper layer if a predetermined timer expires even if there is a missing RLC SDU.

The NR RLC devices 1d-10 and 1d-35 may process the RLC PDUs in a sequence in which the RLC PDUs are received regardless of the order of sequence number (out-of-sequence delivery), and may transmit the same to NR PDCP devices 1d-05 and 1d-40.

In case that the NR RLC devices 1d-10 and 1d-35 receive segments, the NR RLC devices 1d-10 and 1d-35 may receive segments stored in a buffer or segments to be received later, reconfigure the segments as one complete RLC PDU, and then transmit the RLC PDU to the NR PDCP device.

The NR RLC layer may not include a concatenation function, and the concatenation function may be performed by the NR MAC layer, or may be replaced by a multiplexing function of the NR MAC layer.

In the description above, the out-of-sequence delivery function of the NR RLC device may refer to a function of directly transmitting the RLC SDUs, received from the lower layer, to an upper layer regardless of the sequence thereof. The out-of-sequence delivery function of the NR RLC device may include, in case that one RLC SDU has been originally segmented into multiple RLC SDUs and received, a function of reassembling the multiple RLC SDUs and transmitting the same. The out-of-sequence delivery function of the NR RLC device may include a function of storing the RLC SNs or PDCP SNs of the received RLC PDUs, reordering the sequence, and recording the missing RLC PDUs.

The NR MACs 1d-15 and 1d-30 may be connected to multiple NR RLC layer devices configured in one UE, and the main function of the NR MAC may include some of the following functions.

Mapping between logical channels and transport channels
    Multiplexing/de-multiplexing of MAC SDUs
    Scheduling information reporting
    Error correction through HARQ
    Priority handling between logical channels of one UE
    Priority handling between UEs by means of dynamic scheduling
    MBMS service identification
    Transport format selection
    Padding The NR PHY layers 1d-20 and 1d-25 may perform operations of channel-coding and modulating upper layer data, forming the upper layer data into OFDM symbols, transmitting the OFDM symbols via a radio channel or demodulating and channel decoding of the OFDM symbols received via the radio channel, and transferring the OFDM symbols to an upper layer.

Figure 1E:
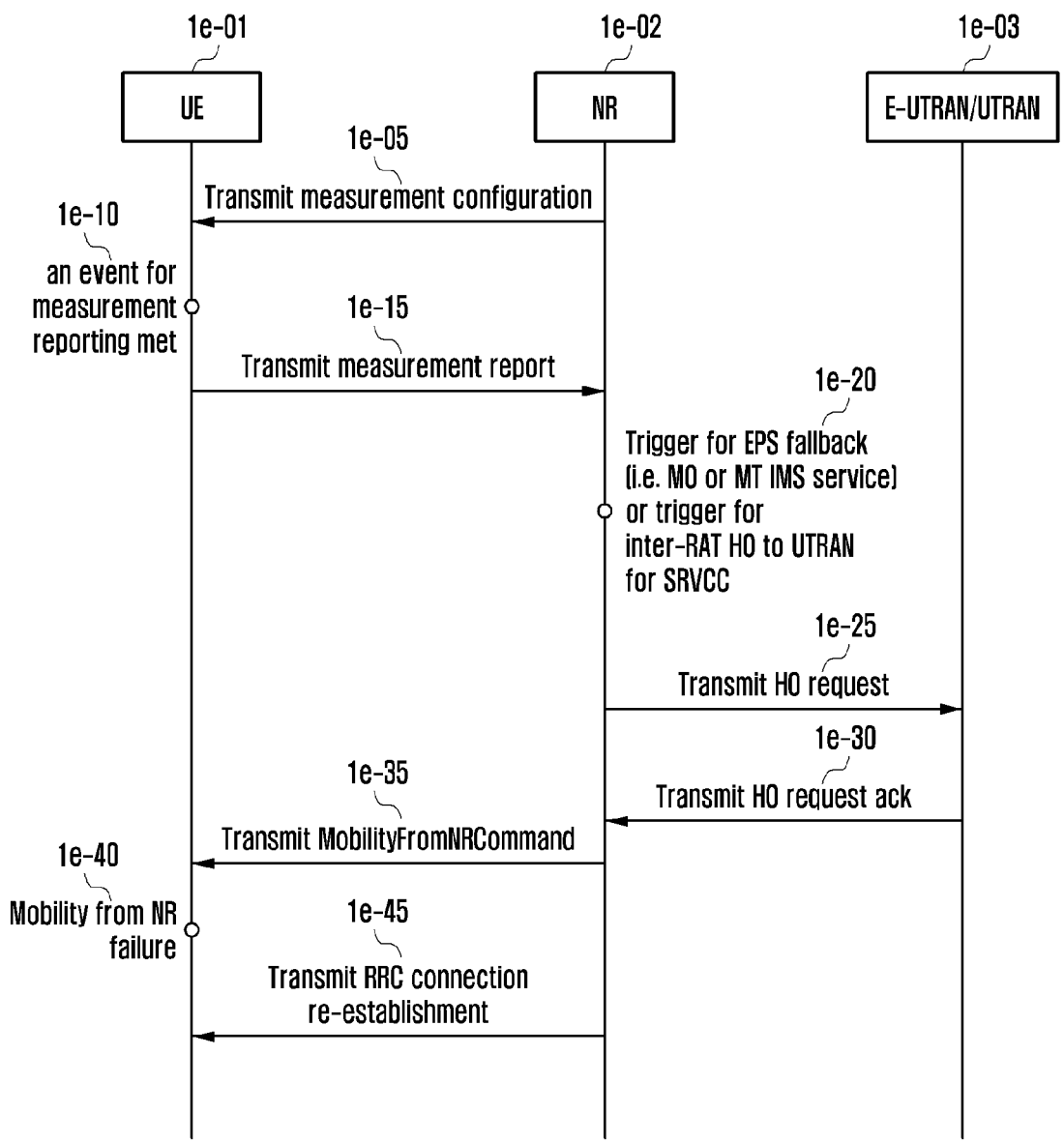
FIG. 1E illustrates a process in which a new radio (NR) base station triggers an inter-radio access technology (RAT) mobility procedure, and an operation in case that a UE fails to successfully perform an inter-RAT mobility procedure according to an embodiment of the disclosure.

FIG. 1E illustrates a process in which an NR base station triggers an inter-RAT mobility procedure, and an operation in case that a UE fails to successfully perform an inter-RAT mobility procedure according to an embodiment of the disclosure.

In FIG. 1E, NR 1e-02 may be called an NR source cell, an NR source base station (or NR source gNB), and the like, and may be called a source cell or a source base station. In addition, an E-UTRAN/UTRAN 1e-03 may be an E-UTRAN target cell or E-UTRAN target base station (target eNB) in case that RAT for handover is an evolved-UTRAN (E-UTRAN), and may be a UTRAN target cell or a UTRAN target base station in case that the RAT for handover is a UMTS terrestrial radio access network (UTRAN). In addition, the E-UTRAN/UTRAN 1e-03 may be referred to as a target cell or a target base station.

A UE 1e-01 receives a predetermined RRC message including measurement configuration information from the NR source cell 1e-02 (or NR source base station) (indicated by reference numeral 1e-05). The UE 1e-01 measures the signal quality of a serving cell and neighboring cells by applying the measurement configuration information, and stores or collects the same. In case that an event configured for measurement reporting occurs (indicated by reference numeral 1e-10) or according to a preconfigured period, the UE 1e-01 reports the collected cell measurement information to the NR source cell 1e-02 (indicated by reference numeral 1e-15).

The NR source cell 1e-02 may determine inter-RAT mobility based on the reported cell measurement information (indicated by reference numeral 1e-20). As an example, the inter-RAT mobility may refer to a handover operation for an evolved packet service (EPS) fallback for supporting a mobile-originating (MO) or mobile-terminated (MT) IP multimedia subsystem (IMS) service, or a handover operation from NR to UTRAN for a single radio voice connectivity call (SRVCC). In case that it is determined to trigger inter-RAT mobility, the NR source cell 1e-02 may request the inter-RAT mobility from the E-UTRAN target cell 1e-03 or the UTRAN target cell 1e-03 through a predetermined inter-node message (indicated by reference numeral 1e-25). For example, the inter-node message may be a handover (HO) request message, but is not limited thereto.

The target cell 1e-03 having received the request determines whether to accept the inter-RAT mobility request and, if accepted, the target cell transmits handover configuration information required for the general inter-RAT mobility operation to the NR source cell 1e-02 (indicated by reference numeral 1e-30). The NR source cell 1e-02 may transfer the configuration information received from the target cell 1e-03 to the UE 1e-01 (indicated by reference numeral 1e-35). For example, the NR source cell 1e-02 may include, in an RRC message, the configuration information received from the target cell 1e-03 and additional configuration information, and may transmit a mobility-related message (e.g., MobilityFromNRCommand message) to the UE 1e-01 (indicated by reference numeral 1e-35). The MobilityFromNRCommand message may include at least one of the following information.

1. An indicator indicating the type of a target RAT (targetRAT-Type). For example, in case that the target RAT type is E-UTRAN, eutra may be included, and in case that the target RAT type is UTRAN, utra may be included.

2. A target RAT message container (targetRAT-MessageContainer). The container message may include a target cell identifier and target cell radio configuration information.

3. NAS security parameter configuration information (nas-SecurityParamFromNR). Security configuration information used for LTE/EPC handover in NR or UTRAN handover in NR and some pieces of information of downlink NAS COUNT may be included.

In operation 1e-35, upon receiving the MobilityFromNRCommand message, the UE 1e-01 may perform at least one of the following series of processes:

the UE may stop T390 timer for all access categories, if the T390 timer is running.

in case that the targetRaT-Type indicates eutra, the UE may consider initiating inter-RAT mobility with E-UTRA. In case that nas-SecurityParamFromNR is included, the UE may transfer the nas-SecurityParamFromNR to an upper layer device.

in case that the targetRaT-Type indicates utra, the UE may consider initiating inter-RAT mobility with UTRA. In case that nas-SecurityParamFromNR is included, the UE may transfer the nas-SecurityParamFromNR to an upper layer device.

the UE may attempt to access the target cell according to the specification of the indicated target RAT.

the UE may reset an MAC layer device. This is to prevent unnecessary retransmission of pieces of data stored in an HARQ buffer.

In operation 1e-40, the UE 1e-01 may determine that other radio access technology (inter-RAT) mobility in NR has failed due to a predetermined reason. The predetermined reason may denote at least one of the following.

a case in which the UE fails to establish an RRC connection based on the indicated target radio access technology a case of not following the configuration information included in the received MobilityFromNRCommand message a case in which a procedure according to an applicable standard in a target RAT cannot be performed or fails because there is a protocol error in the inter-RAT information included in the received MobilityFromNRCommand message In operation 1e-45, the UE 1e-01 may initiate an RRC connection re-establishment procedure with a source NR PCell by reapplying the configuration information used in the source NR PCell (primary cell) (reverting back to the configuration used in the source PCell). For example, the UE 1e-01 may transmit an RRC connection re-establish message to the NR source PCell 1e-02 and may proceed a connection re-establishment procedure with the NR source cell 1e-02.

Figure 1F:
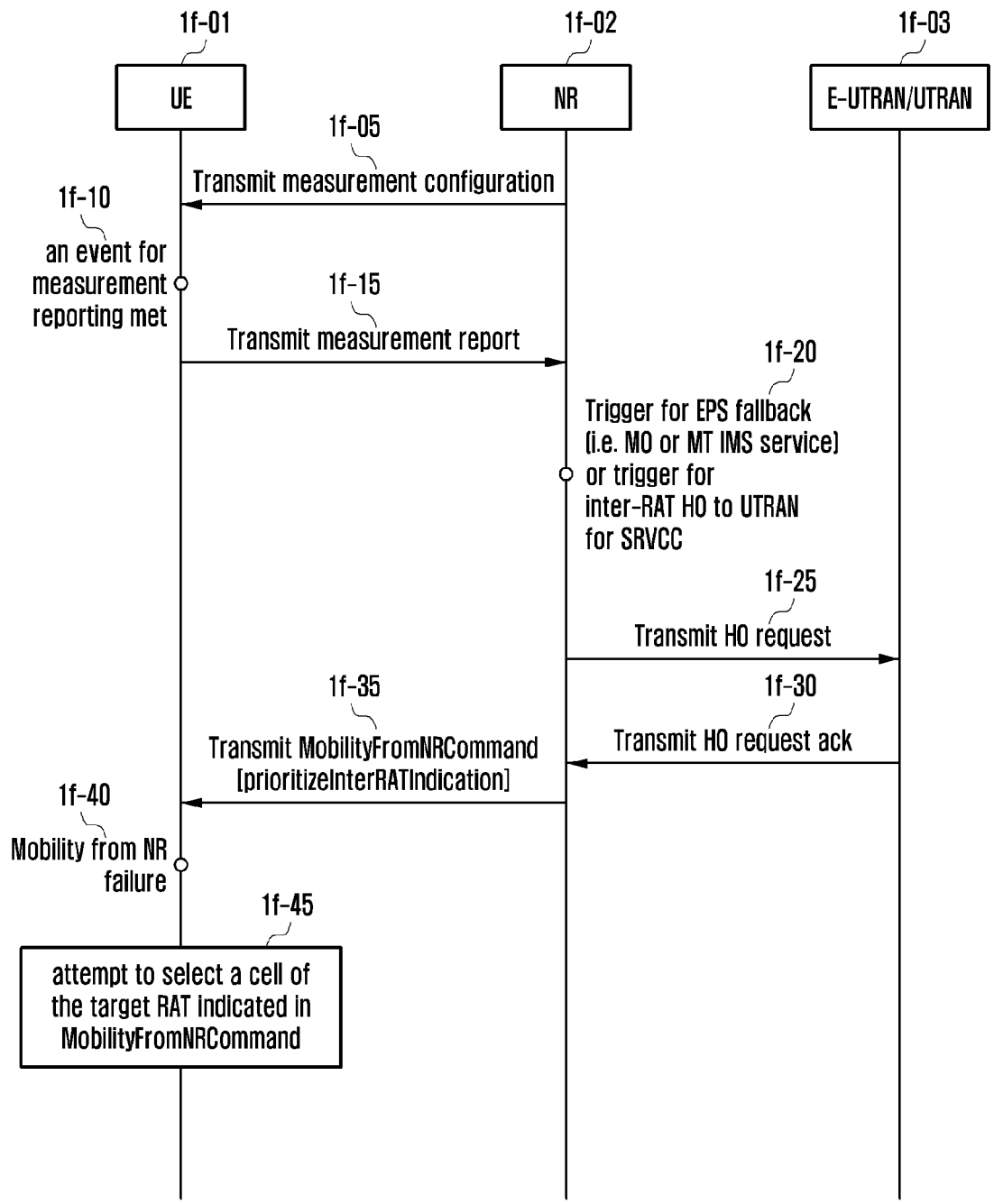
FIG. 1F illustrates a process in which an NR base station triggers an inter-RAT mobility procedure, and an operation in case that a UE fails to successfully perform an inter-RAT mobility procedure according to an embodiment of the disclosure.

FIG. 1F illustrates a process in which an NR base station triggers an inter-RAT mobility procedure, and an operation in case that a UE fails to successfully perform an inter-RAT mobility procedure according to an embodiment of the disclosure.

In FIG. 1F, NR 1f-02 may be called an NR source cell, an NR source base station, or the like, and may be called a source cell or a source base station. In addition, an E-UTRAN/UTRAN 1f-03 may be an E-UTRAN target cell or E-UTRAN target base station in case that RAT for handover is an evolved-UTRAN (E-UTRAN), and may be a UTRAN target cell or a UTRAN target base station in case that the RAT for handover is a UMTS terrestrial radio access network (UTRAN). In addition, the E-UTRAN/UTRAN 1f-03 may be referred to as a target cell or a target base station.

A UE 1f-01 receives a predetermined RRC message including measurement configuration information from the NR source cell 1f-02 (indicated by reference numeral 1f-05). The UE measures the signal quality of a serving cell and neighboring cells by applying the measurement configuration information, and stores or collects the same. In case that an event configured for measurement reporting occurs (indicated by reference numeral 1f-10) or according to a preconfigured period, the UE 1f-01 reports the collected cell measurement information to the NR source cell 1f-02 (indicated by reference numeral 1f-15).

The NR source cell 1f-02 may determine inter-RAT mobility based on the reported cell measurement information (indicated by reference numeral 1*f*-20). As an example, the inter-RAT mobility may refer to a handover operation for an evolved packet service (EPS) fallback for supporting a mobile-originating (MO) or mobile-terminated (MT) IMS service, or a handover operation from NR to UTRAN for a single radio voice connectivity call (SRVCC). In case that it is determined to trigger inter-RAT mobility, the NR source cell 1*f*-02 may request the inter-RAT mobility from the E-UTRAN target cell 1*f*-03 or the UTRAN target cell 1*f*-03 through a predetermined inter-node message (indicated by reference numeral 1*f*-25). For example, the inter-node message may be a handover (HO) request message, but is not limited thereto.

The target cell 1*f*-03 having received the request determines whether to accept the inter-RAT mobility request and, if accepted, the target cell transmits handover configuration information required for the general inter-RAT mobility operation to the NR source cell 1*f*-02 (indicated by reference numeral 1*f*-30). The NR source cell 1*f*-02 may transfer the configuration information received from the target cell 1*f*-03 to the UE 1*f*-01 (indicated by reference numeral 1*f*-35). For example, the NR source cell 1*f*-02 may include, in an RRC message, the configuration information received from the target cell 1*f*-03 and additional configuration information, and may transmit a mobility-related message (e.g., MobilityFromNRCommand message) to the UE 1*f*-01 (indicated by reference numeral 1*f*-35). The MobilityFromNRCommand message may include at least one of the following information.

1. An indicator indicating the type of a target RAT (targetRAT-Type). For example, in case that the target RAT type is E-UTRAN, eutra may be included, and in case that the target RAT type is UTRAN, utra may be included.

2. A target RAT message container (targetRAT-MessageContainer). The container message may include a target cell identifier and target cell radio configuration information.

3. NAS security parameter configuration information (nas-SecurityParamFromNR). Security configuration information used for LTE/EPC handover in NR or UTRAN handover in NR and some pieces of information of downlink NAS COUNT may be included.

4. An indicator indicating that the Inter-RAT access should be prioritized (prioritizeInterRATIndication). In case that the UE fails the inter-RAT mobility procedure, the indicator may instruct the UE not to perform an RRC connection re-establishment procedure with an NR base station, but to perform a cell selection procedure to the indicated RAT. For example, in case of including the indicator, in case that the inter-RAT mobility procedure fails, the UE may perform a process of cell selection to a target RAT cell indicated by the targetRAT-Type. Alternatively, the indicator may directly indicate e-utra or utra. The UE may perform a process of cell selection to the target RAT cell based on the indicator. As an example, in case that the indicator directly indicates e-utra or utra, in case that the inter-RAT mobility procedure fails in the target RAT indicated by the targetRAT-Type, the UE may perform a process of cell selection to the target RAT cell indicated by the indicator without performing the RRC connection re-establishment procedure with the NR base station. The indicator may indicate the same target RAT as the targetRAT-Type or may indicate a different target RAT. Alternatively, even in case that only the indicator is included and the targetRAT-Type is not included, in case that the inter-RAT mobility procedure fails in the target RAT indicated by the indicator, the UE may perform a process of cell selection to the target RAT cell indicated by the indicator without performing the RRC connection re-establishment procedure with the NR base station.

In operation 1*f*-35, upon receiving the MobilityFromNRCommand message, the UE 1*f*-01 may perform at least one of the following series of processes:

the UE may stop T390 timer for all access categories, if the T390 timer is running.

in case that the targetRaT-Type indicates eutra, the UE may consider initiating inter-RAT mobility with E-UTRA. In case that nas-SecurityParamFromNR is included, the UE may transfer the nas-SecurityParamFromNR to an upper layer device.

in case that the targetRaT-Type indicates utra, the UE may consider initiating inter-RAT mobility with UTRA. In case that nas-SecurityParamFromNR is included, the UE may transfer the nas-SecurityParamFromNR to an upper layer device.

the UE may attempt to access the target cell according to the specification of the indicated target RAT.

the UE may reset an MAC layer device. This is to prevent unnecessary retransmission of pieces of data stored in an HARQ buffer. Alternatively, only in case that the prioritizeInterRATIndication is included in the MobilityFromNRCommand message, the UE may reset the MAC layer device.

In operation 1*f*-40, the UE 1*f*-01 may determine that other radio access technology (inter-RAT) mobility in NR has failed due to a predetermined reason. The predetermined reason may denote at least one of the following.

a case in which the UE fails to establish an RRC connection based on the indicated target radio access technology a case of not following the configuration information included in the received MobilityFromNRCommand message case in which a procedure according to the applicable standard in a target RAT cannot be performed or fails because there is a protocol error in the inter-RAT information included in the received MobilityFromNRCommand message In operation 1*f*-45, the UE 1*f*-01 may perform a process of cell selection to a cell of the target RAT indicated in the MobilityFromNRCommand (attempt to select a cell of the target RAT indicated in the MobilityFromNRCommand message).

For example, the UE 1*f*-01 may identify an indicator (prioritizeInterRATIndication) indicating to prioritize the Inter-RAT access in the MobilityFromNRCommand message. In case that the indicator is included, in case that the UE 1*f*-01 fails the inter-RAT mobility procedure, the UE may perform a process of cell selection to the indicated RAT without performing an RRC connection re-establishment procedure with the NR base station. For example, in case that the indicator is included and the inter-RAT mobility procedure fails, the UE 1*f*-01 may perform a process of cell selection to the target RAT cell indicated by targetRAT-Type. Alternatively, in case that the indicator directly indicates e-utra or utra, the UE 1*f*-01 may perform a process of cell selection to the target RAT cell according to the indicator. The UE 1*f*-01 may return to the RRC IDLE state and perform a cell selection process. For example, the UE 1*f*-01 may perform the RRC IDLE operation in the target RAT.

In a case of the existing operation, after the failure of the inter-RAT mobility procedure, the UE should fall back to the target RAT again after re-establishing a connection with the source cell. However, in the embodiment of FIG. 1*f*, since the cell reselection operation can be performed for the target RAT after the failure of the inter-RAT mobility procedure, more efficient UE operation can be provided.

FIG. 1G illustrates an operation of a UE in case that receiving a mobility-related message (MobilityFromNR-Command message) from an NR base station according to an embodiment of the disclosure.

In operation 1g-05, the UE may receive a Mobility-FromNRCommand message from the NR base station. Upon receiving the MobilityFromNRCommand message, the UE may perform at least one of the following series of processes.

the UE may stop T390 timer for all access categories, if the T390 timer is running.
 in case that the targetRaT-Type indicates eutra, the UE may consider initiating inter-RAT mobility with E-UTRA. In case that nas-SecurityParamFromNR is included, the UE may transfer the nas-SecurityParamFromNR to an upper layer device.
 in case that the targetRaT-Type indicates utra, the UE may consider initiating inter-RAT mobility with UTRA. In case that nas-SecurityParamFromNR is included, the UE may transfer the nas-SecurityParamFromNR to an upper layer device.
 the UE may attempt to access the target cell according to the specification of the indicated target RAT.
 the UE may reset an MAC layer device. This is to prevent unnecessary retransmission of pieces of data stored in an HARQ buffer. Alternatively, only in case that the prioritizeInterRATIndication is included in the MobilityFromNRCommand message, the UE may reset the MAC layer device.

In operation 1g-10, the UE 1f-01 may determine that the inter-RAT mobility has failed.

In operation 1g-15, the UE may determine whether the prioritizeInterRATIndication indicator is included in the MobilityFromNRCommand message received in operation 1g-05.

In operation 1g-20, in case that the indicator is not included in the MobilityFromNRCommand message, the UE may initiate an RRC connection re-establishment procedure with a source NR PCell by reapplying the configuration information used in the source NR PCell (reverting back to the configuration used in the source PCell).

In operation 1g-25, in case that the indicator is included in the MobilityFromNRCommand message, the UE may attempt to select a cell of the target RAT indicated in the MobilityFromNRCommand. For example, the UE may perform a process of cell selection to a cell of the target RAT. In case that the target RAT is UTRA, the UE may perform a process of cell selection to a UTRA target cell, and in case that the target RAT is EUTRA, the UE may perform a process of cell selection to a EUTRA cell. In addition, the cell selection process may be performed for a cell selected as the target RAT according to the priority, and in case that the cell selection process fails, the cell selection may be performed for another RAT. In addition, in case that cell selection fails with respect to the target cell, an RRC re-establish procedure may be performed with respect to the source cell.

In operation 1g-30, the UE may determine whether a cell of the target RAT is suitable.

In operation 1g-35, in case that the UE camps on a suitable cell of a target cell, the following series of processes may be performed.

the UE may reset the MAC layer device. Alternatively, in case that the MAC layer device is reset in operation 1g-05, this may not be performed.
 the UE may stop T302 timer if the T302 timer is running.
 the UE may stop T390 timer if the T390 timer is running.
 the UE may stop all running timers except for T302, T320, and T325 timers
 in case that there is a UE Inactive AS context, the UE may release the same.
 the UE may release all security keys.
 the UE may release all radio resources. All radio resources may refer to RLC entity, MAC configuration information, and PDCP entity and SADP entity with regard to established radio resources.
 the UE may instruct the upper layer device that the RRC connection has been released, and at this time, the reason for disconnection may also be transferred. For example, the reason for disconnection may be referred to as "RRC connection failure".
 with regard to the target RAT, the UE may transition to the IDLE mode and perform a cell selection or cell reselection process. That is, this can be understood as that, with regard to the NR cell, the UE transitions to the IDLE mode and does not perform cell selection or cell selection process.

In operation 1g-40, in case that the UE cannot camp-on a suitable cell of the target cell, the UE may initiate an RRC connection re-establishment procedure with a source NR PCell by reapplying configuration information used in the source NR PCell (reverting back to the configuration used in the source PCell).

Figure 1H:
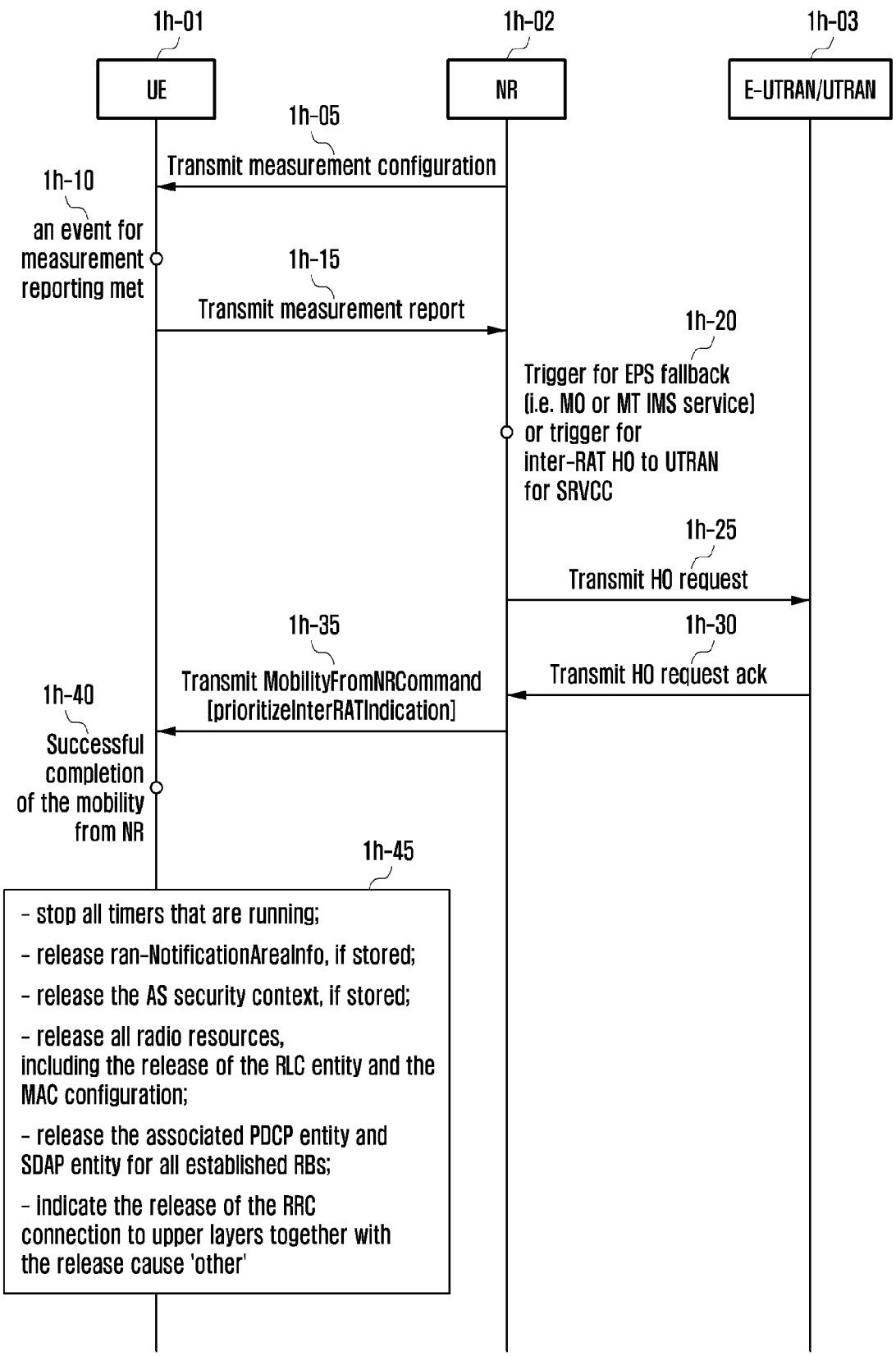
FIG. 1H illustrates a process in which an NR base station triggers an inter-RAT mobility procedure, and an operation in case that a UE successfully performs an inter-RAT mobility procedure according to an embodiment of the disclosure.

FIG. 1H illustrates a process in which an NR base station triggers an inter-RAT mobility procedure, and an operation in case that a UE successfully performs an inter-RAT mobility procedure according to an embodiment of the disclosure.

In FIG. 1H, NR 1h-02 may be called an NR source cell, an NR source base station, and the like, and may be called a source cell or a source base station. In addition, an E-UTRAN/UTRAN 1h-03 may be an E-UTRAN target cell or E-UTRAN target base station in case that RAT for handover is an evolved-UTRAN (E-UTRAN), and may be a UTRAN target cell or a UTRAN target base station in case that the RAT for handover is a UMTS terrestrial radio access network (UTRAN). In addition, the E-UTRAN/UTRAN 1h-03 may be referred to as a target cell or a target base station.

A UE 1h-01 receives a predetermined RRC message including measurement configuration information from the NR source cell 1h-02 (indicated by reference numeral 1h-05). The UE 1h-01 measures the signal quality of a serving cell and neighboring cells by applying the measurement configuration information, and in case that a periodic or configured event occurs (indicated by reference numeral 1h-10), the UE 1h-01 reports the collected cell measurement information to the NR source cell 1h-02 (indicated by reference numeral 1h-15).

The NR source cell 1h-02 may determine inter-RAT mobility based on the reported cell measurement information (indicated by reference numeral 1h-20). As an example, the inter-RAT mobility may refer to a handover operation for an evolved packet service (EPS) fallback for supporting a mobile-originating (MO) or mobile-terminated (MT) IMS service, or a handover operation from NR to UTRAN for a single radio voice connectivity call (SRVCC). In case that it is determined to trigger the inter-RAT mobility, the NR source cell 1h-02 may request the inter-RAT mobility from the E-UTRAN target cell 1h-03 or the UTRAN target cell 1h-03 through a predetermined inter-node message (indicated by reference numeral 1h-25). For example, the inter-node message may be a handover (HO) request message, but is not limited thereto.

The target cell 1h-03 having received the request accepts the inter-RAT mobility request, and transmits handover configuration information required for the general inter-RAT mobility operation to the NR source cell 1h-02 (indicated by reference numeral 1h-30). The NR source cell 1h-02 may include, in an RRC message, the configuration information received from the target cell 1h-03 and additional configuration information, and may transmit a MobilityFromNRCommand message to the UE (indicated by reference numeral 1h-35). The MobilityFromNRCommand message may include at least one of the following information.

1. An indicator indicating the type of a target RAT (targetRAT-Type). For example, in case that the target RAT type is E-UTRAN, eutra may be included, and in case that the target RAT type is UTRAN, utra may be included.

2. A target RAT message container (targetRAT-MessageContainer). The container message may include a target cell identifier and target cell radio configuration information.

3. NAS security parameter configuration information (nas-SecurityParamFromNR). Security configuration information used for LTE/EPC handover in NR or UTRAN handover in NR and some pieces of information of downlink NAS COUNT may be included.

4. An indicator indicating that the Inter-RAT access should be prioritized (prioritizeInterRATIndication). In case that the UE fails the inter-RAT mobility procedure, the indicator may instruct the UE not to perform an RRC connection re-establishment procedure with an NR base station, but to perform a process of cell selection to the indicated RAT. For example, in case of including the indicator, in case that the inter-RAT mobility procedure fails, the UE may perform a process of cell selection to a target RAT cell indicated by the targetRAT-Type. Alternatively, in case that the indicator may directly indicate e-utra or utra, the UE may perform a process of cell selection to the target RAT cell based on the indicator.

In operation 1h-35, upon receiving the MobilityFromNRCommand message, the UE 1h-01 may perform the following series of processes:

the UE may stop T390 timer for all access categories, if the T390 timer is running.

in case that the targetRaT-Type indicates eutra, the UE may consider initiating inter-RAT mobility with E-UTRA. In case that nas-SecurityParamFromNR is included, the UE may transfer the nas-SecurityParamFromNR to an upper layer device.

in case that the targetRaT-Type indicates utra, the UE may consider initiating inter-RAT mobility with UTRA. In case that nas-SecurityParamFromNR is included, the UE may transfer the nas-SecurityParamFromNR to an upper layer device.

the UE may attempt to access the target cell according to the specification of the indicated target RAT.

the UE may reset an MAC layer device. This is to prevent unnecessary retransmission of pieces of data stored in an HARQ buffer. Alternatively, only in case that the prioritizeInterRATIndication is included in the MobilityFromNRCommand message, the UE may reset the MAC layer device.

In operation 1h-40, the UE may successfully perform handover with the cell of the target RAT indicated in the MobilityFromNRCommand message.

In operation 1h-45, the UE may perform the following series of processes for the source PCell.

the UE may stop all running timers.

in case that ran-NotificationAreaInfo is stored, the UE may release the same.

in case that the AS security context is stored, the UE may release the same.

the UE may release all radio resources including RLC entity and MAC configuration information.

the UE may release the PDCP entity and SDAP entity for the established radio bearer.

the UE may indicate upper layer devices that the RRC connection has been released, and may transfer the reason for the release through other processes.

Figure 1I:
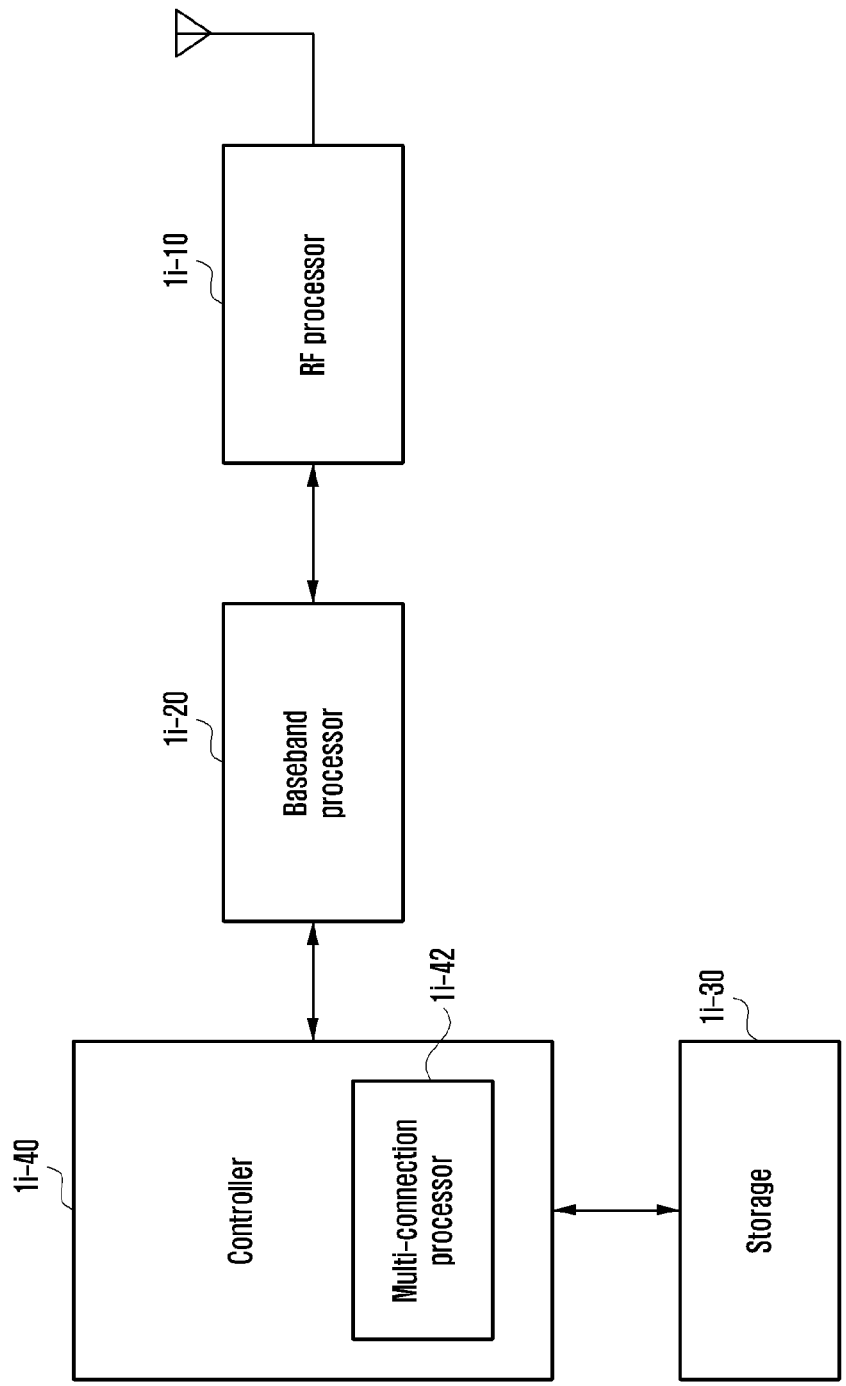
FIG. 1I illustrates the structure of a UE according to an embodiment of the disclosure.

FIG. 1I illustrates the structure of a UE according to an embodiment of the disclosure.

According to an embodiment of the disclosure, the UE may include a radio frequency (RF) processor 1i-10, a baseband processor 1i-20, a storage 1i-30, and a controller 1i-40. The controller 1i-40 may further include a multi-connection processor 1i-42.

According to an embodiment of the disclosure, the RF processor 1i-10 may perform a function of transmitting or receiving a signal through a radio channel, such as band conversion and amplification of a signal. That is, the RF processor 1i-10 may up-convert a baseband signal provided from the baseband processor 1i-20 to an RF band signal and then transmit the same through an antenna, and may down-convert an RF band signal received through the antenna to a baseband signal. For example, the RF processor 1i-10 may include a transmission filter, a reception filter, an amplifier, a mixer, an oscillator, a digital-to-analog converter (DAC), an analog-to-digital converter (ADC), and the like.

Although only one antenna is shown in the drawing, the UE may have a plurality of antennas.

In addition, the RF processor 1i-10 may include a plurality of RF chains. Further, the RF processor 1i-10 may perform beamforming. To perform beamforming, the RF processor 1i-10 may adjust the phases and magnitudes of respective signals transmitted and received through a plurality of antennas or antenna elements. In addition, the RF processor 1i-10 may perform MIMO, and may receive multiple layers in case that performing the MIMO operation. The RF processor 1i-10 may perform reception beam sweeping by appropriately configuring multiple antennas or antenna elements under the control of the controller 1i-40, or may adjust the direction and beam width of the reception beam so that the reception beam is coordinated with the transmission beam.

The baseband processor 1i-20 may perform a function of conversion between a baseband signal and a bit string according to the physical layer specification of the system. For example, in case that transmitting data, the baseband processor 1i-20 encodes and modulates transmission bit strings, thereby generating complex symbols. In addition, in case that receiving data, the baseband processor 1i-20 may reconstruct reception bit strings by demodulating and decoding a baseband signal provided from the RF processor 1i-10. For example, in a case where an orthogonal frequency division multiplexing (OFDM) scheme is applied, in case that transmitting data, the baseband processor 1i-20 may generate complex symbols by encoding and modulating transmission bit strings, map the complex symbols to subcarriers, and then configure OFDM symbols through an inverse fast Fourier transform (IFFT) operation and cyclic prefix (CP) insertion. In addition, in case that receiving data, the baseband processor 1i-20 may divide the baseband signal provided from the RF processor 1*i*-10 into OFDM symbol units, may reconstruct the signals mapped to the subcarriers through a fast Fourier transform (FFT) operation, and then may reconstruct reception bit strings through demodulation and decoding.

The baseband processor 1*i*-20 and the RF processor 1*i*-10 may transmit or receive signals as described above. Accordingly, the baseband processor 1*i*-20 and the RF processor 1*i*-10 may be referred to as a "transmitter", a "receiver", a "transceiver", or a "communication unit". Further, at least one of the baseband processor 1*i*-20 and the RF processor 1*i*-10 may include a plurality of communication modules in order to support a plurality of different radio access techniques. In addition, at least one of the baseband processor 1*i*-20 and the RF processor 1*i*-10 may include different communication modules to process signals in different frequency bands. For example, the different radio access techniques may include an LTE network, an NR network, and the like. In addition, the different frequency bands may include super-high frequency (SHF) (e.g., 2.2 gHz or 2 ghz) bands or millimeter wave (e.g., 60 GHz) bands.

The storage 1*i*-30 may store data such as fundamental programs, application programs, and configuration information for the operation of the UE. The storage 1*i*-30 may provide the stored data in response to a request from the controller 1*i*-40.

The controller 1*i*-40 may control overall operations of the UE. For example, the controller 1*i*-40 may transmit or receive signals through the baseband processor 1*i*-20 and the RF processor 1*i*-10. In addition, the controller 1*i*-40 records and reads data in and from the storage 1*i*-30. To this end, the controller 1*i*-40 may include at least one processor. For example, the controller 1*i*-40 may include a communication processor (CP) for performing control for communication and an application processor (AP) for controlling upper layers such as application programs. Further, the controller 1*i*-40 may control the operation of the UE according to various embodiments of the disclosure. The controller 1*i*-40 may receive a mobility-related message for handover from a first radio access technology (RAT) supporting new radio (NR) to a second RAT through the transceiver, may identify whether the mobility procedure to the second RAT has failed based on the mobility-related message, may identify whether an indicator is included in the mobility-related message in case that the failure of the mobility procedure is identified, may select a cell of the second RAT in case that the indicator is included in the mobility-related message, and may control to perform a radio resource control (RRC) idle operation in the cell of the second RAT. In addition, after selecting the cell of the second RAT, the controller 1*i*-40 may control not to perform a procedure for re-establishing a connection to the source cell of the first RAT. The indicator may be related to an evolved packet service (EPS) fallback for supporting an IP multimedia subsystem (IMS) service. The mobility-related message is a mobility from NR command message, and the mobility-related message may further include an indicator indicating a target RAT type, a target RAT message container, and non-access stratum (NAS) security parameter configuration information. In addition, the indicator may further include information regarding RAT for cell reselection in case that the mobility procedure fails.

Figure 1J:
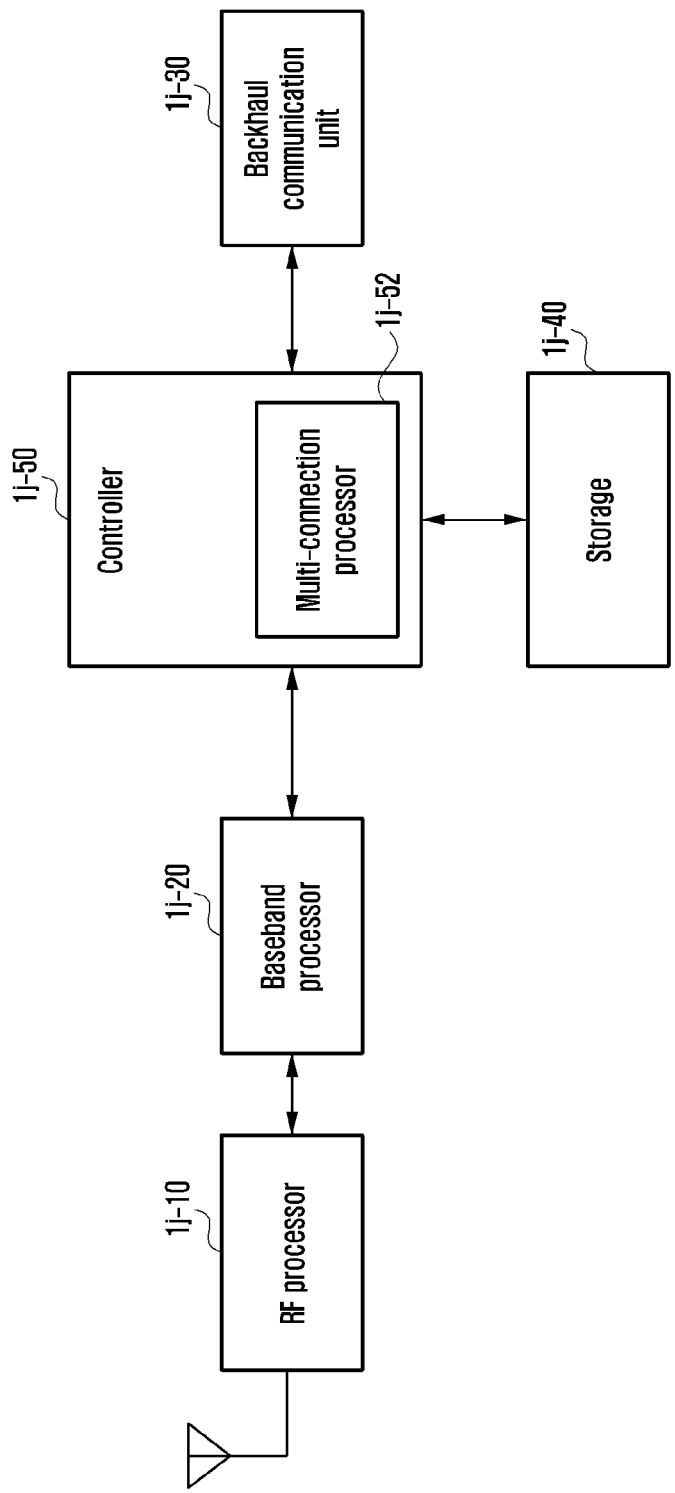
FIG. 1J illustrates the structure of a base station according to an embodiment of the disclosure.

FIG. 1J illustrates the structure of a base station (eNB and gNB) according to an embodiment of the disclosure.

A base station according to an embodiment of the disclosure may include one or more transmission/reception points (TRPs).

A base station according to an embodiment of the disclosure may include an RF processor 1*j*-10, a baseband processor 1*j*-20, a communication unit 1*j*-30, a storage 1*j*-40, and a controller 1*j*-50. The controller 1*j*-50 may further include a multi-connection processor 1*j*-52.

The RF processor 1*j*-10 may perform a function of transmitting or receiving a signal through a radio channel, such as band conversion and amplification of a signal. That is, the RF processor 1*j*-10 may up-convert a baseband signal provided from the baseband processor 1*j*-20 to an RF band signal and then transmit the same through an antenna, and may down-convert an RF band signal received through the antenna to a baseband signal. For example, the RF processor 1*j*-10 may include a transmission filter, a reception filter, an amplifier, a mixer, an oscillator, a digital-to-analog converter (DAC), an analog-to-digital converter (ADC), and the like. Although only one antenna is illustrated in the drawing, a first access node may have a plurality of antennas. In addition, the RF processor 1*j*-10 may include a plurality of RF chains. Further, the RF processor 1*j*-10 may perform beamforming. To perform beamforming, the RF processor 1*j*-10 may adjust the phases and magnitudes of respective signals transmitted and received through a plurality of antennas or antenna elements. The RF processor 1*j*-10 may perform downlink MIMO operation by transmitting one or more layers.

The baseband processor 1*j*-20 may perform a function of conversion between a baseband signal and a bit string according to the physical layer specification of the first radio access technology. For example, in case that transmitting data, the baseband processor 1*j*-20 may encode and modulate transmission bit strings, thereby generating complex symbols. In addition, in case that receiving data, the baseband processor 1*j*-20 may reconstruct reception bit strings by demodulating and decoding a baseband signal provided from the RF processor 1*j*-10. For example, in a case where an OFDM scheme is applied, in case that transmitting data, the baseband processor 1*j*-20 may generate complex symbols by encoding and modulating transmission bit strings, may map the complex symbols to subcarriers, and then may configure OFDM symbols through an IFFT operation and CP insertion. In addition, in case that receiving data, the baseband processor 1*j*-20 may divide the baseband signal provided from the RF processor 1*j*-10 into OFDM symbol units, may reconstruct the signals mapped to the subcarriers through a FFT operation, and then may reconstruct reception bit strings through demodulation and decoding. The baseband processor 1*j*-20 and the RF processor 1*j*-10 may transmit or receive signals as described above. Accordingly, the baseband processor 1*j*-20 and the RF processor 1*j*-10 may be referred to as a "transmitter", a "receiver", a "transceiver", a "communication unit", or a "wireless communication unit".

The communication unit 1*j*-30 may provide an interface for communicating with other nodes in the network.

The storage 1*j*-40 may store data such as a basic program, an application program, and configuration information for the operation of the base station. In particular, the storage 1*j*-40 may store information on a bearer assigned to an accessed UE, a measurement result reported from the accessed UE, and the like. In addition, the storage 1*j*-40 may store information serving as a criterion for determining whether to provide or stop multiple connections to the UE. Further, the storage 1*j*-40 may provide the stored data according to the request of the controller 1*j*-50.

The controller 1*j*-50 may control overall operations of the base station. For example, the controller 1*j*-50 may transmit or receive signals through the baseband processor 1j-20 and the RF processor 1j-10 or through the communication unit 1j-30. In addition, the controller 1j-50 records and reads data in and from the storage 1j-40. To this end, the controller 1j-50 may include at least one processor. In addition, the controller 1j-50 may control the operation of the base station according to various embodiments of the disclosure.

In addition, the controller 1j-50 may initiate a handover procedure related to an evolved packet service (EPS) fallback for supporting an IP multimedia subsystem (IMS) service, and may perform control to transmit, to the UE, a mobility-related message for handover from a first radio access technology (RAT) supporting new radio (NR) to a second RAT through the transceiver. The indicator may be related to EPS fallback for supporting the IMS service. In addition, the mobility-related message is a mobility from NR command message, and the mobility-related message may further include an indicator indicating a target RAT type, a target RAT message container, and non-access stratum (NAS) security parameter configuration information. In addition, the indicator may further include information regarding RAT for cell reselection in case that the mobility procedure fails. In addition, in case that the cell of the second RAT is not selected, a procedure for re-establishing a connection to the source base station may be performed.

The configuration of the base station may be applied to a configuration of an NR base station, a configuration of a UTRA base station, and a configuration of an EUTRA base station according to various embodiments of the disclosure. The storage 1j-40 and the RF processor 1j-10 may be referred to as a transmitter, a receiver, a transceiver, a communication unit, or a wireless communication unit.

<Second Disclosure>

The details of FIGS. 1A, 1B, 1C, and 1D may be equally applied or referred to in the second disclosure.

Figure 2A:
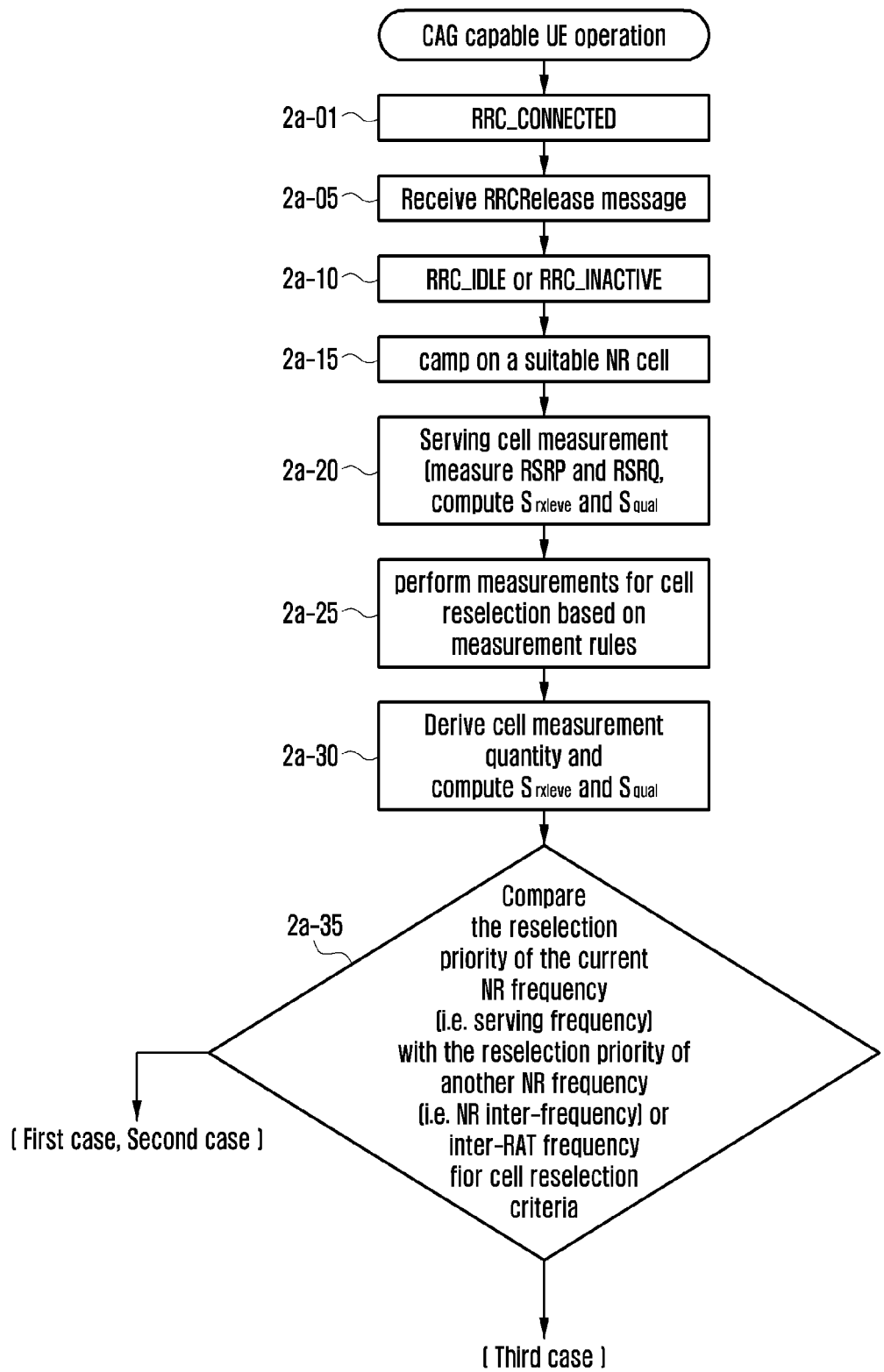
FIG. 2AA and FIG. 2AB illustrate a procedure in which a base station releases a connection of a UE and thus the UE that does not support a closed access group (CAG) switches from an RRC connected mode (RRC_CONNECTED) to an RRC inactive mode (RRC_INACTIVE) or RRC idle mode (RRC_IDLE), and then the UE in the RRC inactive mode (RRC_INACTIVE) or RRC idle mode (RRC_IDLE) performs a cell reselection process according to an embodiment of the disclosure.
Figure 2A:
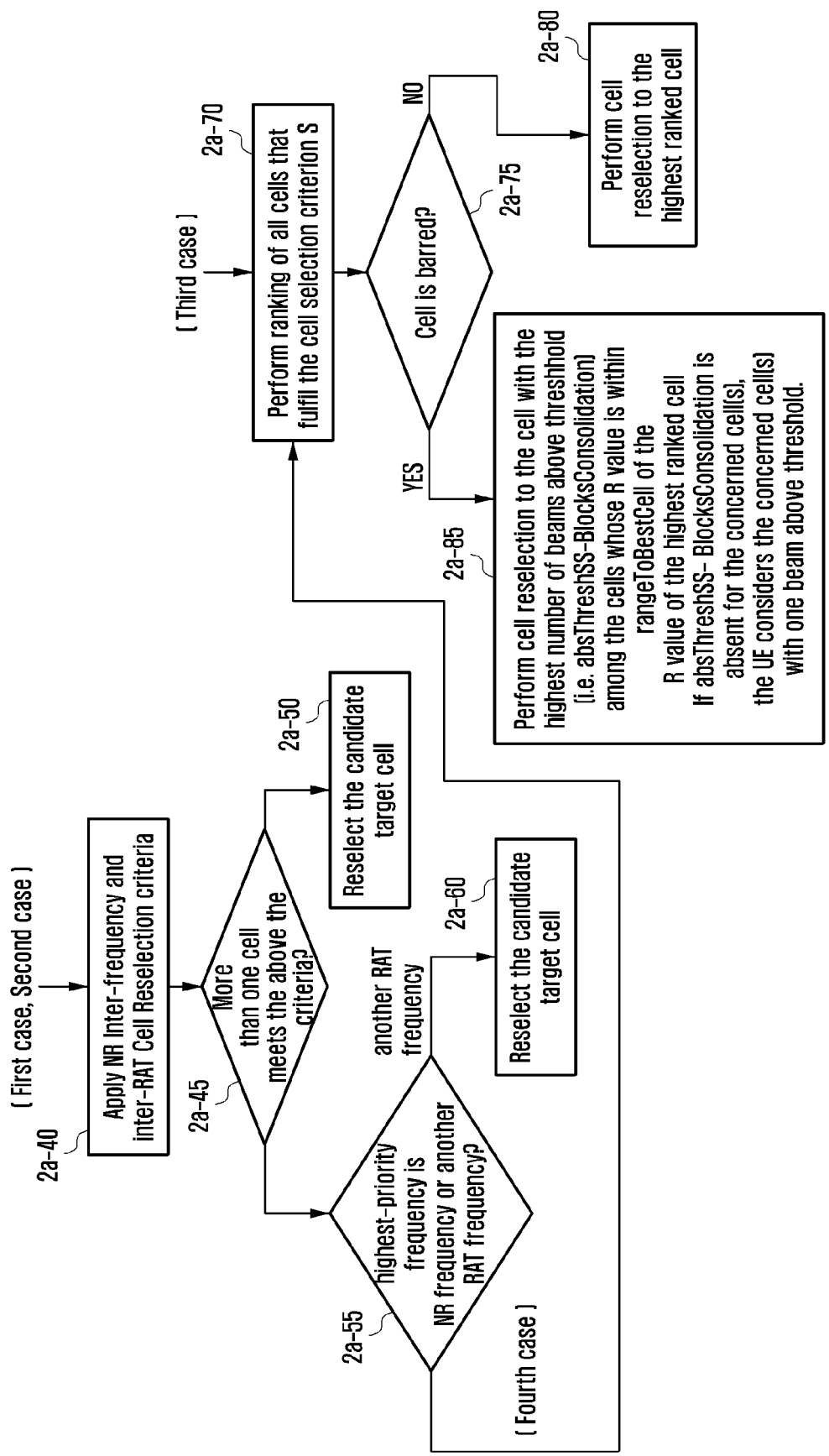

FIGS. 2AA and 2AB illustrate a procedure in which a base station releases a connection of a UE and thus the UE that does not support a closed access group (CAG) switches from an RRC connected mode (RRC_CONNECTED) to an RRC inactive mode (RRC_INACTIVE) or RRC idle mode (RRC_IDLE), and then the UE in the RRC inactive mode (RRC_INACTIVE) or RRC idle mode (RRC_IDLE) performs a cell reselection process according to an embodiment of the disclosure.

The cell reselection process may refer to a procedure of, in case that the service quality of a serving cell becomes lower than the service quality of a neighbor cell due to a predetermined reason or movement, determining by the UE in the RRC idle mode (RRC_IDLE) or RRC inactive mode (RRC_INACTIVE) whether to maintain the current serving cell or to reselect the neighboring cell as a cell.

In a case of handover, whether to perform a handover operation is determined by a network (MME, access and mobility management function (AMF), source eNB, or source gNB). However, in a case of cell reselection, the UE may determine whether to perform a cell reselection operation by itself based on the cell measurement quantity. Cells to be reselected while the UE is moving may refer to a cell using the same NR intra-frequency as that of a serving cell currently camped on, a cell using a different NR frequency (NR inter-frequency) as that of the serving cell, or a cell using a frequency (inter-RAT frequency) used in another radio access technology (hereinafter, RAT).

Referring to FIG. 2A, the UE may be in the RRC connected mode (RRC_CONNECTED) (operation 2a-01).

In operation 2a-05, the UE in the RRC connected mode may receive an RRC connection release message (RRCRelease message) from a base station.

In operation 2a-10, according to whether or not the RRC connection release message received in operation 2a-05 includes suspend configuration information (suspendConfig), the UE may transition to the RRC inactive mode (RRC_INACTIVE) or the RRC idle mode (RRC_IDLE). For example, in case that the RRC connection release message including the suspend configuration information is successfully received, the UE in the RRC connected mode may transition to the RRC inactive mode. On the other hand, in case that the RRC connection release message not including the suspend configuration information is successfully received, the UE in the RRC connected mode may transition to the RRC idle mode.

In operation 2a-15, the UE may perform a cell selection procedure in the RRC idle mode or RRC inactive mode so as to search for a suitable cell and camp-on. A suitable cell searched for and camped on by the UE in the RRC idle mode or RRC inactive mode may be referred to as a serving cell. In order to perform a cell selection procedure, the UE may receive system information (e.g., MIB and/or SIB1) broadcast from a cell. According to another example, the UE may receive system information (e.g., SIB2 and/or SIB3 and/or SIB4 and/or SIB5) broadcast by the cell before or after camp-on the cell. SIB2 may include information/parameters commonly applied to reselection of NR intra-frequency, NR inter-frequency, and inter-RAT frequency cells by the UE in the RRC idle mode or RRC inactive mode. SIB3 may include information/parameters applied only to reselect an NR intra-frequency cell by the UE in the RRC idle mode or RRC inactive mode. SIB4 may include information/parameters applied only to reselect an NR inter-frequency cell by the UE in the RRC idle mode or RRC inactive mode. SIB5 may include information/parameters applied only to reselect an inter-RAT frequency cell by the UE in the RRC idle mode or RRC inactive mode.

In operation 2a-20, the UE in the RRC idle mode or RRC inactive mode may measure the absolute signal strength (reference signal received power (RSRP, Qrxlevmeas)) and the relative signal quality (reference signal received quality (RSRQ, Qqualmeas)) of the serving cell. Specifically, the UE may derive the reception level (Srxlev) and reception quality (Squal) of the serving cell by using the parameters included in the SIB1 received in operation 2a-15. As an example, the reception level and reception quality of the serving cell may be derived through Equation 1 below.

$$Srxlev = Qrxlevmeas - (Qrxlevmin + Qrxlevminoffset) - Pcompensation - Qoffset_{temp},$$

$$Squal = Qqualmeas - (Qqualmin + Qqualminoffset) - Qoffset_{temp}. \quad <\text{Equation 1}>$$

Definitions of parameters used in Equation 1 may refer to the 3GPP standard document "38.304: user equipment (UE) procedures in Idle mode and RRC Inactive state". Hereinafter, the same is applied to embodiments of the disclosure to which Equation 1 is applied.

In operation 2a-25, the UE in the RRC idle mode or RRC inactive mode may perform measurement for cell reselection. Here, the UE may perform neighbor cell measurement based on the following measurement rule due to a predetermined reason or in order to minimize battery consumption.

In case that the reception level and reception quality of the serving cell are greater than a threshold value (Srxlev>SIntraSearchP and SintraSearchQ), the UE may not perform NR intra-frequency measurement.

In case that the reception level and reception quality of the serving cell are smaller than or equal to the threshold value (Srxlev<=SIntraSearchP and SintraSearchQ), the UE may perform NR intra-frequency measurement.

The UE may perform measurement on the NR inter-frequency or inter-RAT frequency having a reselection priority higher than that of the NR frequency of the current serving cell.

In case that the reception level and reception quality of the serving cell are greater than the threshold value (Srxlev>SnonIntraSearchP and SnonintraSearchQ), the UE may not perform measurement on the NR inter-frequency having a reselection priority lower than or equal to that of the NR frequency of the current serving cell or on the inter-RAT frequency having a reselection priority lower than that of the NR frequency of the current serving cell.

In case that the reception level and reception quality of the serving cell are smaller than or equal to the threshold value (Srxlev<=SnonIntraSearchP and SnonintraSearchQ), the UE may perform measurement on the NR inter-frequency having a reselection priority lower than or equal to that of the NR frequency of the current serving cell or on the inter-RAT frequency having a reselection priority lower than that of the NR frequency of the current serving cell.

The frequency priority information may refer to frequency priority information included in the cell reselection priority information included in the RRC connection release message in case that the cell reselection priority information is included in the RRC connection release message received in operation 2a-05. The frequency priority information may refer to, in case that the RRC connection release message received in operation 2a-05 does not include cell reselection priority information, cell reselection priority information included in the system information received in operation 2a-15.

The threshold values (SIntraSearchP, SintraSearchQ, SnonIntraSearchP, and SnonintraSearchQ) may be included in SIB2.

In operation 2a-30, in order to reselect a cell performing a multi-beam operation, the UE in the RRC idle mode or RRC inactive mode may derive a measurement quantity of each cell based on the beams corresponding to each cell with reference to the SS/PBCH block. The UE according to an embodiment of the disclosure may derive a cell measurement quantity according to the following method.

In case that the following condition 1 is fulfilled, the UE may derive, as the highest beam measurement quantity value, a measurement quantity of a neighboring cell in the same NR intra-frequency as that of the serving cell. In case that the following condition 1 is not fulfilled, the UE may derive the measurement quantity values of the neighboring cells in the same NR frequency as that of the serving cell by averaging up to nrofSS-BlocksToAverage among the highest beam measurement quantity values greater than absThreshSS-BlocksConsolidation (linear average of the power values up to nrofSS-BlocksToAverage of highest beam measurement quantity values above absThreshSS-BlocksConsolidation).
> A case in which condition 1 is fulfilled may refer to a case in which at least one of the following detailed conditions is fulfilled.
>> In case that nrofSS-BlocksToAverage is not configured in SIB2 or
>> In case that absThreshSS-BlocksConsolidation is not configured in SIB2 or
>> In case that the highest beam measurement quantity value is smaller than or equal to absThreshSS-BlocksConsolidation In case that the following condition 2 is fulfilled, the UE may derive, as the highest beam measurement quantity value, a measurement quantity of a neighboring cell in an NR inter-frequency different from that of the serving cell. In case that the following condition 2 is not fulfilled, the UE may derive the measurement quantity values of neighboring cells in NR frequencies different from that of the serving cell by averaging up to nrofSS-BlocksToAverage among the highest beam measurement quantity values greater than absThreshSS-BlocksConsolidation (linear average of the power values up to nrofSS-BlocksToAverage of highest beam measurement quantity values above absThreshSS-BlocksConsolidation).
> A case in which condition 2 is fulfilled may refer to a case in which at least one of the following detailed conditions is fulfilled.
>> In case that nrofSS-BlocksToAverage is not configured in SIB4 or
>> In case that absThreshSS-BlocksConsolidation is not configured in SIB4 or
>> In case that the highest beam measurement quantity value is smaller than or equal to absThreshSS-BlocksConsolidation Since nrofSS-BlocksToAverage and absThreshSS-BlocksConsolidation can be signaled through SIB4 for each NR inter-frequency, the UE may derive the measurement quantity values of neighboring cells in NR inter-frequency by applying condition 2 for each NR inter-frequency.

In operation 2a-30, the UE in the RRC idle mode or RRC inactive mode may derive a measurement quantity of each cell in order to reselect a cell (e.g., an LTE cell in inter-RAT frequency) that does not perform multi-beam operation. The cell measurement quantity may refer to absolute signal strength (reference signal received power (RSRP, Qrxlevmeas)) or relative signal quality (reference signal received quality (RSRQ, Qqualmeas)).

In operation 2a-30, the UE may derive the reception level and reception quality of each cell through the derived measurement quantity of each cell. Specifically, the reception level and reception quality of the neighboring cells in the same NR intra-frequency as that of the serving cell may be derived through Equation 1 by using the parameters included in SIB2 or SIB3 received in operation 2a-15. The reception level and reception quality of a neighboring cell in an NR intra-frequency different from that of the serving cell may be derived through the Equation 1 by using the parameters included in SIB2 or SIB4 received in operation 2a-15. The reception level and reception quality of the neighboring cells in the inter-RAT frequency different from that of the serving cell may be derived through the Equation 1 by using the parameters included in SIB2 or SIB5 received in operation 2a-15.

The UE in the RRC idle mode or RRC inactive mode may apply cell reselection criteria differently according to frequency priority. Accordingly, in operation 2a-35, the UE may compare the priority of the current serving frequency with the priority of the NR inter-frequency, or may compare the priority of the current serving frequency with the priority of the inter-RAT frequency. The UE may apply different cell reselection criteria with regard to the following four cases.
> First case:
>> In case that there is at least one NR inter-frequency or inter-RAT frequency having a priority higher than that of the current serving frequency
> Second case:
>> In case that there is at least one NR inter-frequency or inter-RAT frequency having a priority lower than that of the current serving frequency
> Third case:
>> In case that there is at least one current serving frequency or NR inter-frequency having the same priority as that of the current serving frequency
> Fourth case:
>> In case that there are multiple NR cells fulfilling the cell reselection criteria according to the first case or the second case The UE may perform cell reselection to a higher priority RAT/frequency by taking precedence over a lower priority RAT/frequency in case that multiple cells fulfilling the cell reselection criteria have different priorities (Cell reselection to a higher priority RAT/frequency shall take precedence over a lower priority RAT/frequency if multiple cells of different priorities fulfill the cell reselection criteria). As an example, the UE may perform cell reselection by giving the highest priority to the first case or the fourth case occurring due to the first case. In case that the above cases are not fulfilled, the UE may perform cell reselection according to the third case. In case that all of the above cases are not fulfilled, the UE may perform cell reselection according to the second case or the fourth case occurring due to the second case.

In case that the cell reselection criteria need to be applied according to the first case, the UE in the RRC idle mode or RRC inactive mode may apply the NR inter-frequency and inter-RAT cell reselection criteria in operation 2a-40. The NR inter-frequency and inter-RAT cell reselection criteria are as follows.
  in case that threshServingLowQ is broadcast through system information (e.g., SIB2) broadcast from the serving cell and more than 1 second has elapsed since the UE camped-on the current serving cell,
    > The UE may derive a candidate target cell list for each frequency by determining whether the following condition A is fulfilled by one or multiple cells in each frequency. TreselectionRAT parameter and ThreshX,HighQ parameter used in condition A may be included in the system information. For example, in a case of a cell in the NR frequency having a higher priority than the serving frequency, the parameter values may be included in SIB4, and in a case of a cell in the inter-RAT frequency having a higher priority than the serving frequency, the parameter values may be included in SIB5.
      >> Condition A: In case that the reception quality (Squal) of a cell in a higher priority NR frequency or E-UTRAN RAT cell is greater than ThreshX, HighQ during a time interval TreselectionRAT (A cell of a higher priority NR or E-UTRAN RAT/frequency fulfils Squal>ThreshX,HighQ during a time internal TreselectionRAT)
  Otherwise,
    > The UE may derive a candidate target cell list for each frequency by determining whether the following condition B is fulfilled by one or multiple cells in each frequency. TreselectionRAT parameter and ThreshX,HighQ parameter used in condition B may be included in the system information. For example, in a case of a cell in the NR frequency having a higher priority than the serving frequency, the parameter values may be included in SIB4, and in a case of a cell in the inter-RAT frequency having a higher priority than the serving frequency, the parameter values may be included in SIB5.
      >> Condition B: In case that more than 1 second has elapsed since the UE camped on the current serving cell, and the reception level (Srxlev) of the RAT cell or frequency cell in a high priority is greater than ThreshX,HighP during a time internal TreselectionRAT (A cell of a higher priority RAT/frequency fulfils Srxlev>ThreshX,HighP during a time internal TreselectionRAT)

In operation 2a-45, the UE may determine whether there are multiple cells fulfilling the cell reselection criteria applied in operation 2a-40. Here, the multiple cells may refer to multiple cells in one highest-priority frequency, or may refer to multiple cells regarding all frequencies fulfilling a case in which multiple highest-priority frequencies exist and thus one or multiple cells exist for each frequency.

In operation 2a-50, in case that there is only one final candidate target cell, the UE may perform cell reselection to the corresponding cell. Here, the UE may receive MIB and SIB1 broadcast from the corresponding cell, may find that the cell status is "barred" is not indicated or not to be treated as if the cell status is "barred", may newly derive the reception level and reception quality of the corresponding cell based on the received SIB1, and may determine whether the cell fulfils the cell reselection criteria (Srxlev>0 AND Squal>0) to finally perform reselection to the cell.

In operation 2a-55, the UE may determine whether the highest-priority frequency is the NR frequency or the frequency of another RAT.

In operation 2a-60, the UE may perform cell reselection to the highest ranked cell among the cells on the highest priority frequency (ies) meeting the criteria of the RAT. The UE may receive MIB and SIB1 broadcast from the highest ranked cell, may find that the cell status is "barred" is not indicated or not to be treated as if the cell status is "barred", may newly derive the reception level and reception quality of the corresponding cell based on the received SIB1, and may determine whether the cell fulfils the cell reselection criteria (Srxlev>0 AND Squal>0) to finally perform reselection to the cell.

In operation 2a-55, in case that the highest-priority frequency is the NR frequency, the UE may perform operation 2a-70. Cells performing operation 2a-70 may refer to multiple cells in one highest-priority frequency, or may refer to multiple cells regarding all frequencies fulfilling a case in which multiple highest-priority frequencies exist and thus one or multiple cells exist for each frequency.

In case that the cell reselection criteria need to be applied due to the fourth case occurring due to the first case, the UE shall perform ranking of all cells that fulfill the cell selection criterion S in operation 2a-70. Here, ranking may be performed only on cells in the frequency derived in operation 2a-55. A cell fulfilling the cell selection criterion may denote a cell in which the reception level (Srxlev) and reception quality (Squal) derived by the UE in operation 2a-30 are greater than zero. With regard to cells fulfilling the cell selection criterion, the UE may derive a rank for each cell based on the RSRP measurement quantity. Ranks of the serving cell and the neighboring cell may be respectively calculated through Equation 2 below.

Ranks of the serving cell and the neighboring cell may be respectively calculated through Equation 2 below.

$$Rs = Q_{meas,s} + Q_{hyst} - \text{Qoffset}_{temp}$$

$$Rn = Q_{meas,n} - \text{Qoffset} - \text{Qoffset}_{temp} \quad \text{<Equation 2>}$$

Where

| | |
|---|---|
| $Q_{meas}$ | RSRP measurement quantity used in cell reselections. |
| Qoffset | For intra-frequency: Equals to $\text{Qoffset}_{s,n}$, if $\text{Qoffset}_{s,n}$ is valid, otherwise this equals to zero.<br>For inter-frequency: Equals to $\text{Qoffset}_{s,n}$ plus $\text{Qoffset}_{frequency}$, if $\text{Qoffset}_{s,n}$ is valid, otherwise this equals to $\text{Qoffset}_{frequency}$. |
| $\text{Qoffset}_{temp}$ | Offset temporarily applied to a cell as specified in TS 38.331 [3]. |

Here, Qmeas,s is the RSRP measurement quantity of the serving cell, Qmeas,n is the RSRP measurement quantity of the neighboring cell, Qhyst is the hysteresis value of the serving cell, and Qoffset is the offset between the serving cell and the neighboring cell. The Qhyst value is included in SIB2, and the corresponding value may be commonly used for intra-frequency/inter-frequency cell reselection. In a case of intra-frequency cell reselection, Qoffset is signaled for each cell and applied only to the indicated cell, and may be included in SIB5. In a case of inter-frequency cell reselection, Qoffset is signaled for each cell and applied only to the indicated cell, and may be included in SIB4.

In operation 2a-75, the UE in the RRC idle mode or RRC inactive mode may determine whether rangeToBestCell is configured in the system information. rangeToBestCell may be signaled through SIB2 and may be commonly used for intra-frequency and inter-frequency cell reselection. Alternatively, rangeToBestCell may be signaled through SIB4, which may be used only for inter-frequency cell reselection.

In operation 2a-80, the UE in the RRC idle mode or the RRC inactive mode may perform reselection to the highest ranked cell derived in operation 2a-70. In order to perform reselection to the new cell (highest ranked cell), the following conditions need to be fulfilled.

In operation 2a-85, the UE in RRC idle mode or RRC inactive mode may perform cell reselection to the cell with the highest number of beams above the threshold (i.e., absThreshSS-BlocksConsolidation) among the cells whose R value is within rangeToBestCell of the R value of the highest ranked cell. Here, absThreshSS-BlocksConsolidation may be signaled for each NR inter-frequency in SIB4. In operation 2a-55, in case that one NR inter-frequency having the highest priority is derived and multiple candidate target cells exist in the NR inter-frequency, absThreshSS-BlocksConsolidation for the NR inter-frequency may not be configured in SIB4. In this case, the operation of reselection to which cell by the UE may become ambiguous. Alternatively, in operation 2a-55, in case that multiple NR inter-frequencies having the highest-priority frequencies are derived and one or multiple candidate target cells exist for each corresponding frequency, and in case that absThreshSS-BlocksConsolidation for at least one corresponding NR inter-frequency is not configured in SIB4, the operation of reselection to which cell by the UE may become ambiguous. Therefore, in case that absThreshSS-BlocksConsolidation is not configured for the NR inter-frequency in which the one or multiple candidate target cells are located, the UE according to an embodiment of the disclosure may propose to apply the cell reselection criteria by considering that one beam above the absThreshSS-BlocksConsolidation exists in the corresponding candidate target cell. In case that absThreshSS-BlocksConsolidation for the NR inter-frequency in which the candidate target cell is located is configured, the UE may apply the cell reselection criterion configured as the signaled value.

| If absThreshSS-BlocksConsolidation in SIB4 is signalled for the concerned highest-priority NR inter-frequency(ies) | Cell reselection criteria |
|---|---|
| Yes, use signalled value | Highest # of beams above threshold (i.e. absThreshSS-BlocksConsolidation) among the cells whose R value is within rangetoBestCell of the R value of the highest ranked cell |
| No, the UE regards any cell on the concerned highest-priority NR inter-frequency(ies) with one beam above the threshold | |

A cell that fulfils the cell reselection criteria needs to be better than the current serving cell during a time interval TrselectionRAT (the new cell is better than the serving cell according to the cell reselection criteria during a time interval TreselectionRAT).

More than 1 second needs to be elapsed since the UE camped on the current serving cell.

The UE may receive MIB and SIB1 broadcast from a cell fulfilling the above condition, may find that the cell status is "barred" is not indicated or not to be treated as if the cell status is "barred", may newly derive the reception level and reception quality of the corresponding cell based on the received SIB1, and may determine whether the cell fulfils the cell reselection criteria (Srxlev>0 AND Squal>0) to finally perform reselection to the cell.

In order to perform reselection to a new cell fulfilling the above condition, the following conditions need to be fulfilled.

A cell that fulfils the cell reselection criteria needs to be better than the current serving cell during a time interval TrselectionRAT (the new cell is better than the serving cell according to the cell reselection criteria during a time interval TreselectionRAT).

More than 1 second needs to be elapsed since the UE camped on the current serving cell.

In case that one cell fulfils the above condition, the UE may determine the cell as a final candidate cell and perform reselection thereto. In case that multiple cells fulfill the above condition, the UE may determine, as the final candidate cell, the highest ranked cell among the multiple cells and perform cell reselection thereto (If there are multiple such cells, the UE shall perform cell reselection to the highest ranked cell among them). The UE may receive MIB and SIB1 broadcast from the highest ranked cell, may find that the cell status is "barred" is not indicated or not to be treated as if the cell status is "barred", may newly derive the reception level and reception quality of the corresponding cell based on the received SIB1, and may determine whether the cell fulfils the cell reselection criteria (Srxlev>0 AND Squal>0) to finally perform reselection to the cell.

In case that the cell reselection criteria need to be applied according to the second case, the UE in the RRC idle mode or RRC inactive mode may apply the NR inter-frequency and inter-RAT cell reselection criteria in operation 2a-40. The NR inter-frequency and inter-RAT cell reselection criteria are as follows.

In case that threshServingLowQ is broadcast through system information (e.g., SIB2) broadcast by the UE in the serving cell, and 1 second has elapsed since the UE camped-on the current serving cell,
> The UE may derive a candidate target cell list for each frequency by determining whether the following condition C is fulfilled by one or multiple cells in each frequency. TreselectionRAT parameter, ThreshServing,LowQ parameter, and ThreshX,LowQ parameters used in condition C may be included in system information. As an example, the parameter for the serving frequency (e.g., ThreshServing,LowQ) may be included in SIB2, in a case of a cell in an NR frequency having a lower priority than the serving frequency, the parameter values (e.g., TreselectionRAT, ThreshX,LowQ) may be included in SIB4, and in a case of a cell in an inter-RAT frequency having a lower priority than the serving frequency, the parameter values (e.g., TreselectionRAT, ThreshX,LowQ) may be included in SIB5.
>> Condition C: in case that the reception quality (Squal) of the current serving cell is smaller than ThreshServing,LowQ, and the reception quality (Squal) of a cell of NR frequency in the lower priority or E-UTRAN/RAT cell is greater than that of ThreshX,LowQ during a time interval TreselectionRAT (The serving frequency fulfils Squal<ThreshServing,LowQ and a cell of a lower priority NR or E-UTRAN RAT/frequency fulfils Squal>ThreshX,LowQ during a time internal TreselectionRAT)

Otherwise,
> The UE may derive a candidate target cell list for each frequency by determining whether the following condition D is fulfilled by one or multiple cells in each frequency. TreselectionRAT parameter, ThreshServing,LowP parameter, ThreshX,LowP parameter used in condition D may be included in the system information. For example, a parameter for the serving frequency (e.g., ThreshServing,LowP) may be included in SIB2, in a case of a cell in the NR frequency having a lower priority than the serving frequency, the parameter values (e.g., TreselectionRAT, ThreshX,LowP) may be included in SIB4, and in a case of a cell in the inter-RAT frequency having a lower priority than the serving frequency, the parameter values (e.g., TreselectionRAT, ThreshX, LowP) may be included in SIB5.
>> Condition D: in case that more than 1 second has elapsed since the UE camped on the current serving cell, the reception level (Srxlev) of the current serving cell is smaller than ThreshServing,LowP, and the reception level (Srxlev) of a cell in a lower priority RAT or frequency is greater than ThreshX, LowP during a time interval TreselectionRAT (The serving frequency fulfils Srxlev<ThreshServing,LowP and a cell of a lower priority RAT/frequency fulfils Srxlev>ThreshX, LowP during a time internal TreselectionRAT)

In operation 2a-45, the UE may determine whether there are multiple cells fulfilling the cell reselection criteria applied in operation 2a-40. Here, the multiple cells may refer to multiple cells in one highest-priority frequency, or may refer to multiple cells regarding all frequencies fulfilling a case in which multiple highest-priority frequencies exist and thus one or multiple cells exist for each frequency.

In operation 2a-50, in case that there is only one final candidate target cell, the UE may perform cell reselection to the corresponding cell. Here, the UE may receive MIB and SIB1 broadcast from the corresponding cell, may find that the cell status is "barred" is not indicated or not to be treated as if the cell status is "barred", may newly derive the reception level and reception quality of the corresponding cell based on the received SIB1, and may determine whether the cell fulfils the cell reselection criteria (Srxlev>0 AND Squal>0) to finally perform reselection to the cell.

In operation 2a-55, the UE may determine whether the highest-priority frequency is the NR frequency or the frequency of another RAT.

In operation 2a-60, the UE may perform cell reselection to the highest ranked cell among the cells on the highest priority frequency (ies) meeting the criteria of the RAT. The UE may receive MIB and SIB1 broadcast from the highest ranked cell, may find that the cell status is "barred" is not indicated or not to be treated as if the cell status is "barred", may newly derive the reception level and reception quality of the corresponding cell based on the received SIB1, and may determine whether the cell fulfils the cell reselection criteria (Srxlev>0 AND Squal>0) to finally perform reselection to the cell.

In operation 2a-55, in case that the highest-priority frequency is the NR frequency, the UE may perform operation 2a-70. Cells performing operation 2a-70 may refer to multiple cells in one highest-priority frequency, or may refer to multiple cells regarding all frequencies fulfilling a case in which multiple highest-priority frequencies exist and thus one or multiple cells exist for each frequency.

In case that the cell reselection criteria need to be applied due to the fourth case occurring due to the second case, the UE shall perform ranking of all cells that fulfill the cell selection criterion S in operation 2a-70. Here, ranking may be performed only on cells in the frequency derived in operation 2a-55. A cell fulfilling the cell selection criterion may denote a cell in which the reception level (Srxlev) and reception quality (Squal) derived by the UE in operation 2a-30 are greater than zero. With regard to cells fulfilling the cell selection criterion, the UE may derive a rank for each cell based on the RSRP measurement quantity. Ranks of the serving cell and the neighboring cell may be respectively calculated through Equation 2 above.

In operation 2a-75, the UE in the RRC idle mode or RRC inactive mode may determine whether rangeToBestCell is configured in the system information.

In operation 2a-80, the UE in the RRC idle mode or the RRC inactive mode may perform reselection to the highest ranked cell derived in operation 2a-70. In order to perform reselection to the new cell (highest ranked cell), the following conditions need to be fulfilled.

A cell that fulfils the cell reselection criteria needs to be better than the current serving cell during a time interval TrselectionRAT (the new cell is better than the serving cell according to the cell reselection criteria during a time interval TreselectionRAT).

More than 1 second needs to be elapsed since the UE camped on the current serving cell.

The UE may receive MIB and SIB1 broadcast from a cell fulfilling the above condition, may find that the cell status is "barred" is not indicated or not to be treated as if the cell status is "barred", may newly derive the reception level and reception quality of the corresponding cell based on the received SIB1, and may determine whether the cell fulfils the cell reselection criteria (Srxlev>0 AND Squal>0) to finally perform reselection to the cell.

In operation 2a-85, the UE in RRC idle mode or RRC inactive mode may perform cell reselection to the cell with the highest number of beams above the threshold (i.e., absThreshSS-BlocksConsolidation) among the cells whose R value is within rangeToBestCell of the R value of the highest ranked cell. Here, absThreshSS-BlocksConsolidation may be signaled for each NR inter-frequency in SIB4. In operation 2a-55, in case that one NR inter-frequency having the highest priority is derived and multiple candidate target cells exist in the NR inter-frequency, absThreshSS-BlocksConsolidation for the NR inter-frequency may not be configured in SIB4. In this case, the operation of reselection to which cell by the UE may become ambiguous. Alternatively, in operation 2a-55, in case that multiple NR inter-frequencies having the highest-priority frequencies are derived and one or multiple candidate target cells exist for each corresponding frequency, and in case that absThreshSS-BlocksConsolidation for at least one corresponding NR inter-frequency is not configured in SIB4, the operation of reselection to which cell by the UE may become ambiguous. Therefore, in case that absThreshSS-BlocksConsolidation is not configured for the NR inter-frequency in which the one or multiple candidate target cells are located, the UE according to an embodiment of the disclosure may apply the cell reselection criterion by considering that one beam above the absThreshSS-BlocksConsolidation exists in the one or multiple candidate target cells. In case that absThreshSS-BlocksConsolidation for the NR inter-frequency in which the candidate target cell is located is configured, the UE may apply the cell reselection criterion configured as the signaled value.

More than 1 second needs to be elapsed since the UE camped on the current serving cell.

In case that one cell fulfils the above condition, the UE may determine the cell as a final candidate cell and perform reselection thereto. In case that multiple cells fulfill the above condition, the UE may determine, as the final candidate cell, the highest ranked cell among the multiple cells and perform cell reselection thereto (If there are multiple such cells, the UE shall perform cell reselection to the highest ranked cell among them). The UE may receive MIB and SIB1 broadcast from the final candidate cell, may find that the cell status is "barred" is not indicated or not to be treated as if the cell status is "barred", and may determine whether the reception level and reception quality of the corresponding cell, newly derived based on the received SIB1, fulfill the cell reselection criteria (Srxlev>0 AND Squal>0) to finally perform reselection to the cell.

In case that the cell reselection criteria need to be applied according to the third case, in operation 2a-70, the UE in the RRC idle mode or RRC inactive mode may perform ranking on all cells fulfilling the cell selection criterion (The UE shall perform ranking of all cells that fulfill the cell selection criterion S). A cell fulfilling the cell selection criterion may refer to a cell in which the reception level (Srxlev) and reception quality (Squal) derived by the UE in operation 2a-30 are greater than zero. With regard to cells fulfilling the cell selection criterion, the UE may derive a rank for each cell based on the RSRP measurement quantity. Ranks of the serving cell and the neighboring cell may be respectively calculated through Equation 2 above.

In operation 2a-75, the UE in the RRC idle mode or RRC inactive mode may determine whether rangeToBestCell is configured in the system information. The rangeToBestCell may be signaled through SIB2, and may be commonly used for intra-frequency and inter-frequency cell reselection. According to another example, the rangeToBestCell may be signaled through SIB4, which may be used only for inter-frequency cell reselection.

In operation 2a-80, the UE in the RRC idle mode or the RRC inactive mode may perform reselection to the highest ranked cell based on rank for each cell derived in operation 2a-70 (the UE shall perform cell reselection to the highest ranked cell). In order to perform reselection to the new cell (highest ranked cell) by the UE, the following conditions need to be fulfilled.

| If absThreshSS-BlocksConsolidation in SIB4 is signalled for the concerned highest-priority NR inter-freqnency(ies) | Cell reselection criteria |
|---|---|
| Yes, use signalled value | Highest # of beams above threshold (i.e. absThreshSS-BlocksConsolidation) among the cells whose R value is within rangetoBestCell of the R value of the highest ranked cell |
| No, the UE regards any cell on the concerned highest-priority NR inter-frequency(ies) with one beam above the threshold | |

In order to perform reselection to a new cell fulfilling the above condition, the following conditions need to be fulfilled.

A cell that fulfils the cell reselection criteria needs to be better than the current serving cell during a time interval TrselectionRAT (the new cell is better than the serving cell according to the cell reselection criteria during a time interval TreselectionRAT).

A cell that fulfils the cell reselection criteria needs to be better than the current serving cell during a time interval TrselectionRAT (the new cell is better than the serving cell according to the cell reselection criteria during a time interval TreselectionRAT).

More than 1 second needs to be elapsed since the UE camped on the current serving cell.

The UE may perform cell reselection to a cell fulfilling the above condition. Here, the UE may receive MIB and SIB1 broadcast from the corresponding cell, may find that the cell status is "barred" is not indicated or not to be treated as if the cell status is "barred", and may determine whether the reception level and reception quality of the corresponding cell, newly derived based on the received SIB1, fulfill the cell reselection criteria (Srxlev>0 AND Squal>0) to finally perform reselection to the cell.

In operation 2a-85, the UE in RRC idle mode or RRC inactive mode may perform cell reselection to the cell with the highest number of beams above the threshold (i.e., absThreshSS-BlocksConsolidation) among the cells whose R value is within rangeToBestCell of the R value of the highest ranked cell. Here, absThreshSS-BlocksConsolidation for NR inter-frequency may be signaled through SIB2, and absThreshSS-BlocksConsolidation for equal-priority NR frequency may be signaled for each equal-priority NR inter-frequency through SIB4. In case that absThreshSS-BlocksConsolidation is not configured in SIB2 or SIB4, the operation of reselection to which cell by the UE may become ambiguous. Therefore, in case that absThreshSS-BlocksConsolidation is not configured for the NR inter-frequency in which the one or multiple candidate target cells are located, or in case that absThreshSS-BlocksConsolidation is not configured for the equal-priority NR inter-frequency in which the one or multiple candidate target cells are located, the UE according to an embodiment of the disclosure may perform cell reselection by determining that there is one beam above the absThreshSS-BlocksConsolidation in the candidate target cells. In case that absThreshSS-BlocksConsolidation is configured in the candidate target cells, the UE may apply the cell reselection criterion configured as the signaled value.

that the cell status is "barred" is not indicated or not to be treated as if the cell status is "barred", and may determine whether the reception level and reception quality of the corresponding cell, newly derived based on the received SIB1, fulfill the cell reselection criteria (Srxlev>0 AND Squal>0) to finally perform reselection to the cell.

Figure 2B:
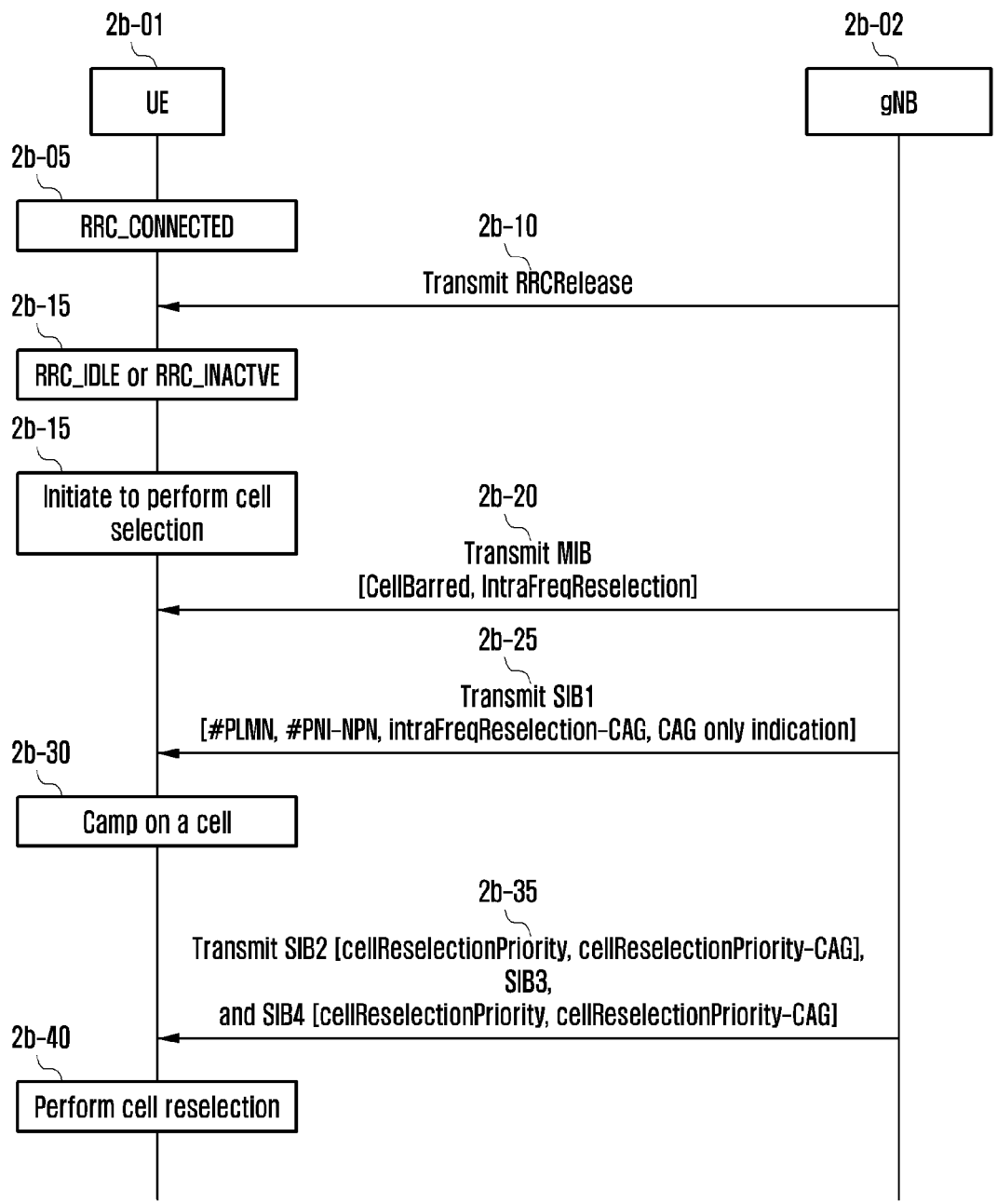
FIG. 2B illustrates a procedure in which a base station releases a connection of a UE supporting a closed access group (CAG) and thus the UE switches from an RRC connected mode (RRC_CONNECTED) to an RRC inactive mode (RRC_INACTIVE) or RRC idle mode (RRC_IDLE), and then the UE in the RRC inactive mode (RRC_INACTIVE) or RRC idle mode (RRC_IDLE) performs a cell reselection process according to an embodiment of the disclosure.

FIG. 2B illustrates a procedure in which a base station releases a connection of a UE supporting a closed access group (CAG) and thus the UE switches from an RRC connected mode (RRC_CONNECTED) to an RRC inactive mode (RRC_INACTIVE) or RRC idle mode (RRC_IDLE), and then the UE in the RRC inactive mode (RRC_INACTIVE) or RRC idle mode (RRC_IDLE) performs a cell reselection process according to an embodiment of the disclosure.

Referring to FIG. 2B, the UE supporting the CAG may be in an RRC connected mode (RRC_CONNECTED) by establishing an RRC connection with the base station (operation 2b-05).

In operation 2b-10, the UE in the RRC connected mode may receive an RRC connection release message (RRCRelease message) from the base station.

In operation 2b-11, the UE may transition to the RRC inactive mode (RRC_INACTIVE) or the RRC idle mode (RRC_IDLE) according to whether or not the received RRC connection release message includes suspend configuration information (suspendConfig).

In operation 2b-15, the UE may initiate a cell selection procedure. In order to perform a cell selection procedure, the UE may acquire MIB broadcast by a cell (operation 2b-20), and may acquire SIB1 (operation 2b-25). The cell may include at least a cellBarred indicator and an intraFreqRe-

| If absThreshSS-BlocksConsolidation in SIB2 is signalled for NR intra-frequency | If absThreshSS-BlocksConsolidation in SIB4 is signalled for equal-priority NR inter-frequency(ies) | Cell reselection criteria |
| --- | --- | --- |
| Yes, use signalled value for threshold (i.e. absThreshSS-BlocksConsolidation) for cells of NR intra-frequency | Yes, use signalled value for threshold (i.e. absThreshSS-BlocksConsolidarion) for cells of equal-priority NR frequency(ies) | Highest # of beams above threshold (i.e. absThreshSS-BlocksConsolidation) among the cells whose R value is within rangetoBestCell of the R value of the highest ranked cell |
| No, the UE regards any cell on the NR intra-frequency with one beam above the threshold | No, the UE regards any cell on the equal-priority NR inter-frequency(ies) with one beam above the threshold | |

In order to perform, by the UE, reselection to a new cell fulfilling the above condition, the following conditions need to be fulfilled.

- A cell that fulfils the cell reselection criteria needs to be better than the current serving cell during a time interval TrselectionRAT (the new cell is better than the serving cell according to the cell reselection criteria during a time interval TreselectionRAT).
- More than 1 second needs to be elapsed since the UE camped on the current serving cell.

In case that one cell fulfils the above condition, the UE may determine the cell as a final candidate cell and perform reselection thereto. In case that multiple cells fulfill the above condition, the UE may determine, as the final candidate cell, the highest ranked cell among the multiple cells and perform cell reselection thereto (If there are multiple such cells, the UE shall perform cell reselection to the highest ranked cell among them). The UE may receive MIB and SIB1 broadcast from the final candidate cell, may find selection indicator in MIB. Here, the cellBarred indicator may be applied to both a UE supporting CAG and a UE not supporting CAG. For example, in case that the cellBarred indicator is indicated as barred, all UEs may regard the corresponding cell as barred. The cell may include at least one of a cell ID list not related to CAG in SIB1, a public land mobile network (PLMN) list mapped to each cell ID, a public network integrated (PNI)-non-public network (NPN) related to CAG (identified by PLMN ID+CAG ID) list, an intraFreqReselection-CAG indicator intended to indicate to a UE supporting CAG, and information of a CAG only indication (indicator indicating whether the corresponding cell supports only the CAG function). In case that the CAG only indication is configured to TRUE, in case that at least one PNI-NPN of the received PNI-NPN list is included in the Allowed CAG list of the UE, the UE supporting CAG may access the cell (CAG member cell). In case that at least one PNI-NPN of the received PNI-NPN list is not included in the Allowed CAG list of the UE, the UE may regard the cell as barred. In case that the CAG only indication is configured to FALSE, in case that at least one PNI-NPN of the received PNI-NPN list is included in the Allowed CAG list of the UE, the UE supporting CAG may access the cell (hybrid cell: CAG member cell+normal cell). In case that the CAG only indication is configured to FALSE, in case that at least one PNI-NPN of the received PNI-NPN list is not included in the Allowed CAG list of the UE, the UE supporting CAG may consider the cell as barred.

In case that the UE regards the cell as barred, the UE may exclude the cell considered as barred from candidate cells for cell selection or cell reselection for up to 300 seconds or for 300 seconds (The UE may exclude the barred cell as a candidate for cell selection/reselection for up to 300 seconds or for 300 seconds).

With regard to other cells in the intra-frequency to which the barred cell belongs, the UE may perform at least one of the following operations.

Operation 1: According to intraFreqReselection indicated in MIB, the UE may perform cell selection or cell reselection for other cells in an intra-frequency to which the barred cell belongs. As an example, in case that intraFreqReselection is indicated as not allowed in MIB, the UE may exclude other cells in a frequency (intra-frequency) to which the barred cell belongs from candidate cells for cell selection or cell reselection for up to 300 seconds or for 300 seconds. In case that intraFreqReselection is indicated in MIB as allowed, the UE may select another cell in case that the other cell in a frequency (intra-frequency) to which the barred cell belongs fulfils the cell reselection criterion.

Operation 2: Other cells in a frequency (intra-frequency) to which the barred cell belongs may be excluded from candidate cells for cell selection or cell reselection for up to 300 seconds or for 300 seconds.

Operation 3: Other cells in a frequency (intra-frequency) to which the barred cell belongs may be excluded from candidate cells for cell selection or cell reselection for up to 300 seconds or for 300 seconds.

Operation 4: In case that PNI-NPN (identified by PLMN ID+CAG ID) existing in SIM is included in the Allowed CAG list of the UE although cellBarred is configured as barred, the UE may reselect other cells in a frequency to which the cell belongs according to the intraFreqReselection-CAG indicator indicated in SIB1. For example, in case that the intraFreqReselection-CAG indicator is allowed, the UE may reselect other cells in a frequency to which the barred cell belongs. In case that the intraFreqReselection-CAG indicator is configured as not allowed, the UE may exclude other cells in a frequency to which the barred cell belongs from candidate cells for cell selection or cell reselection for 300 seconds or up to 300 seconds (The UE shall exclude the barred cell and the cells on the same frequency as a candidate for cell selection/reselection for 300 seconds or up to 300 seconds).

Operation 5: In case that PNI-NPN (identified by PLMN ID+CAG ID) existing in SIB1 is not included in the Allowed CAG list of the UE, the UE may select or reselect other cells in a frequency (intra-frequency) to which the barred cell belongs according to intraFreqReselection indicated in MIB. For example, in case that intraFreqReselection is indicated as not allowed in MIB, the UE may exclude other cells in a frequency (intra-frequency) to which the barred cell belongs from candidate cells for cell selection or cell reselection for 300 seconds or up to 300 seconds. In case that intraFreqReselection is indicated as allowed in MIB, the UE may select another cell in case that the other cell in a frequency (intra-frequency) to which the barred cell belongs fulfils the cell reselection criterion.

Alternatively, in operation 2b-30, in case that failing to acquire MIB, the UE may regard the cell as barred. In case that the cell is barred, the UE may exclude the barred cell from candidate cells for cell selection or cell reselection for up to 300 seconds (The UE may exclude the barred cell as a candidate for cell selection/reselection for up to 300 seconds). In addition, in case that a cell selection condition or a cell reselection condition is fulfilled for other cells in a frequency to which the barred cell belongs, the UE may select or reselect other cells in the frequency to which the barred cell belongs. Alternatively, in operation 2b-30, in case that failing to acquire SIB1, the UE may regard the cell as barred. In case that the cell is barred, the UE may exclude the barred cell from candidate cells for cell selection or cell reselection for up to 300 seconds (The UE may exclude the barred cell as a candidate for cell selection/reselection for up to 300 seconds). In addition, in case that another cell in a frequency (intra-frequency) to which the barred cell belongs fulfils the cell reselection criterion, the UE may select the other cell.

In operation 2b-35, the UE may acquire additional system information, such as SIB2, SIB3, SIB4, SIB5, from a cell camped on in operation 2b-30. The cell may provide separate frequency priorities to a UE supporting CAG to SIB2 and SIB4 and a UE not supporting CAG thereto.

In operation 2b-40, the UE may perform a cell reselection process. A UE supporting CAG may apply frequency priority based on cellReselectionPriority-CAG existing in SIB2 in case that performing intra-frequency reselection in the cell reselection process, and may apply frequency priority based on cellReselectionPriority-CAG existing in SIB4 in case that performing inter-frequency reselection. Additionally, in operation 2b-40, the cell may separately provide a cell reselection parameter to be used by a UE supporting CAG to SIB2/SIB3/SIB4. In case that the UE supporting CAG is provided with a separate cell reselection parameter, a cell selection or cell reselection evaluation procedure may be performed by applying the separate cell reselection parameter based on the above-described embodiment.

Figure 2C:
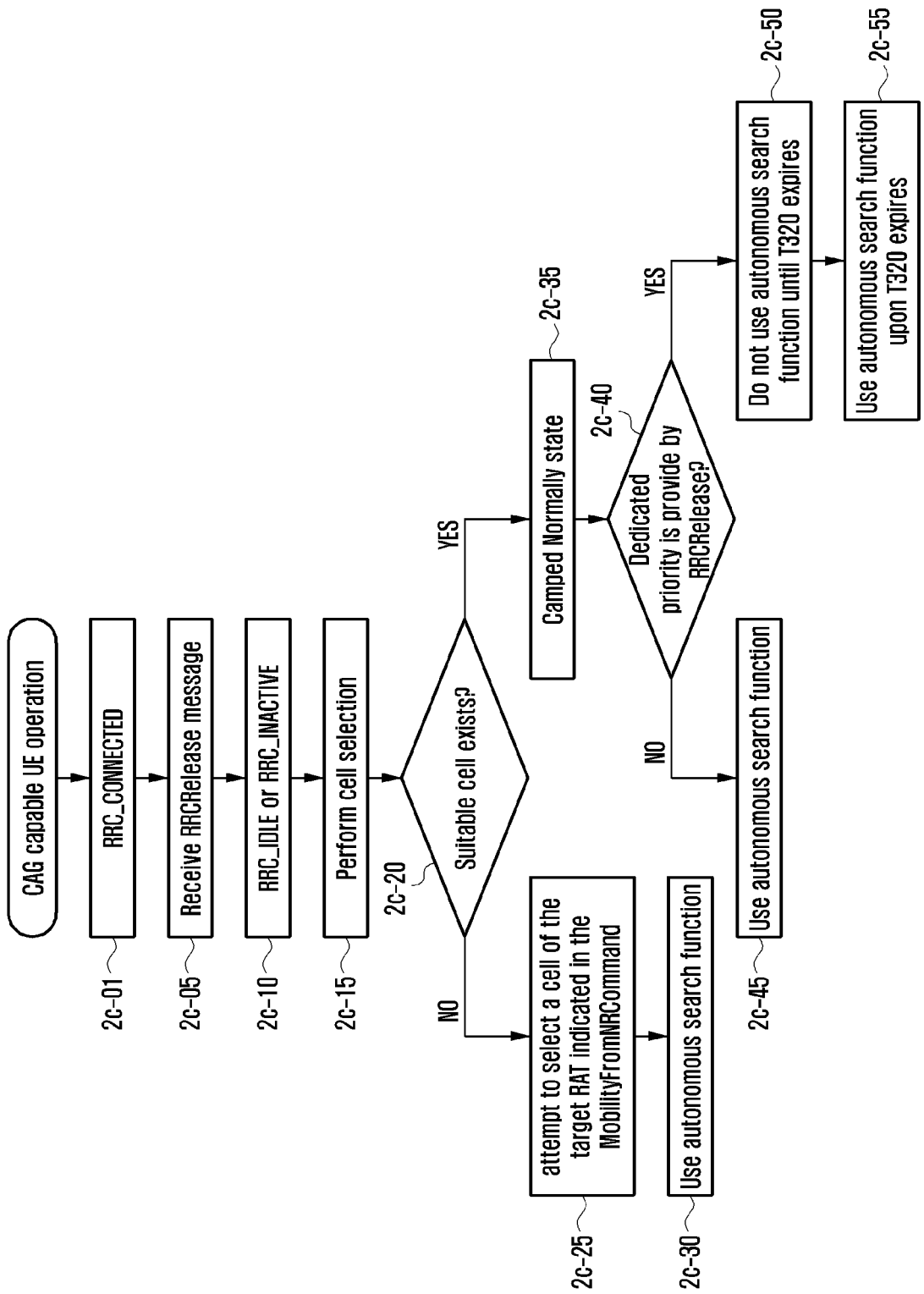
FIG. 2C illustrates a procedure in which a base station releases a connection of a UE supporting a closed access group (CAG) and thus the UE switches from an RRC connected mode (RRC_CONNECTED) to an RRC inactive mode (RRC_INACTIVE) or RRC idle mode (RRC_IDLE), and then the UE in the RRC inactive mode (RRC_INACTIVE) or RRC idle mode (RRC_IDLE) performs cell selection or cell reselection using an autonomous search function according to an embodiment of the disclosure.

FIG. 2C illustrates a procedure in which a base station releases a connection of a UE supporting a closed access group (CAG) and thus the UE switches from an RRC connected mode (RRC_CONNECTED) to an RRC inactive mode (RRC_INACTIVE) or RRC idle mode (RRC_IDLE), and then the UE in the RRC inactive mode (RRC_INACTIVE) or RRC idle mode (RRC_IDLE) performs cell selection or cell reselection using an autonomous search function according to an embodiment of the disclosure.

Referring to FIG. 2C, a UE supporting CAG may be in an RRC connected mode (RRC_CONNECTED) by establishing an RRC connection with a base station (operation 2c-01).

In operation 2c-05, the UE may receive an RRCRelease message from the base station. The RRCRelease message may include frequency priority information used for cell reselection.

In operation 2c-10, the UE may transition to the RRC inactive mode (RRC_INACTIVE) or the RRC idle mode (RRC_IDLE).

In operation 2c-15, the UE may perform a cell selection process.

In operation 2c-20, the UE may determine whether there is a suitable cell through a cell selection process.

In operation 2c-25, the UE may not search for a suitable cell, and may be in any cell selection state or camped on any cell state.

In operation 2c-30, the UE may perform a cell selection or cell reselection process by using an autonomous search function. The autonomous search function may be understood as that the UE detects a CAG member cell previously accessed and performs cell selection or cell reselection therefor.

In operation 2c-35, the UE may search for a suitable cell and may be in a camped normally state.

In operation 2c-40, the UE may determine whether frequency priority information (cellReselectionPriorities) is included in the RRCRelease message received in operation 2c-05. The frequency priority information may include a frequency priority for each radio access technology and a T320 timer value.

In operation 2c-45, the UE may perform cell selection or cell reselection process by using an autonomous search function.

In operation 2c-50, the UE may perform a cell reselection process based on frequency priority information included in the RRCRelease message. The UE may drive a T320 timer in operation 2c-05. That is, in operation 2c-50, the driven T320 timer does not expire.

In operation 2c-55, in case that the driven T320 timer expires, the UE may perform cell selection or cell reselection process by using the autonomous search function.

Figure 2D:
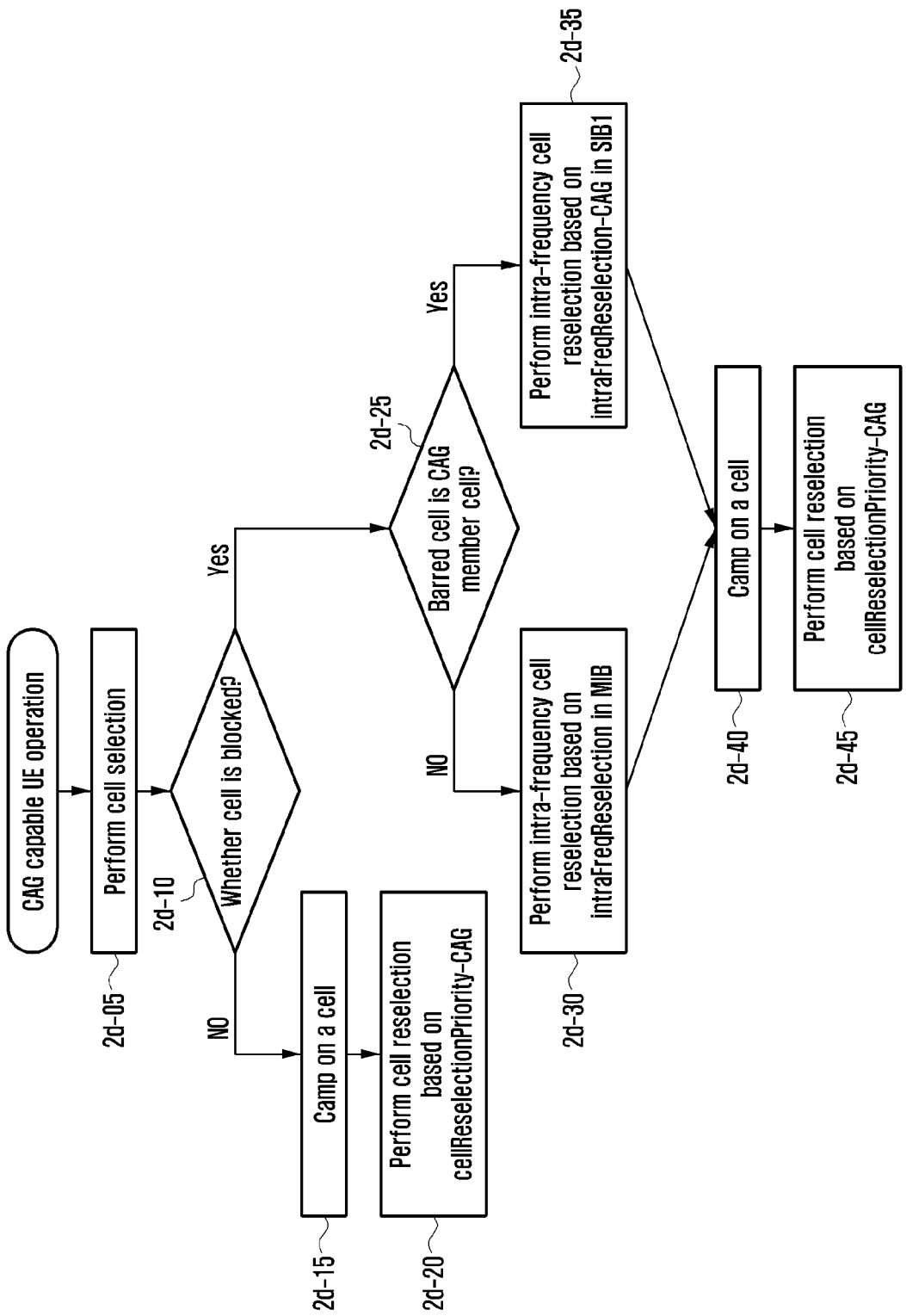
FIG. 2D illustrates an operation in which a UE supporting CAG camps on a CAG capable cell and an operation in which a UE supporting CAG performs cell reselection by applying specific frequency priority information according to an embodiment of the disclosure.

FIG. 2D illustrates an operation in which a UE supporting CAG camps on a CAG capable cell and an operation in which a UE supporting CAG performs cell reselection by applying specific frequency priority information according to an embodiment of the disclosure.

In operation 2d-05, the UE supporting CAG may perform a cell selection process.

In operation 2d-10, the UE may determine whether the cell is considered as barred.

In operation 2d-15, in case that the cell is not considered as barred, the UE may camp-on the cell.

In operation 2d-20, the UE may perform a cell reselection process by applying separate frequency priority information for reselecting a CAG cell to system information received from the camp-on cell. That is, the UE may perform a cell reselection process by applying the frequency priority information for CAG provided through SIB2 to other cells in the same frequency as that for the camped-on cell. Here, in case that a separate cell reselection parameter for CAG exists, the UE may apply the same to other cells to perform a cell reselection process.

In operation 2d-25, the UE may determine whether the cell is regarded as barred because the cell is not a CAG member cell of the UE. In case that it is determined that the cell is not a CAG member cell, it may be understood as that one or multiple PNI-NPNs (identified by PLMN ID+CAG ID) broadcast by the cell are not included in the Allowed CAG list of the UE.

In operation 2d-30, the UE may perform cell reselection for other cells in a frequency (intra-frequency) to which the barred cell belongs according to the intraFreqReselection indicator indicated in MIB. That is, in case that the intraFreqReselection indicator is allowed, the UE may perform cell reselection for other cells in a frequency (intra-frequency) to which the barred cell belongs.

In operation 2d-35, the UE may perform cell reselection for other cells in a frequency (intra-frequency) to which the barred cell belongs according to the intraFreqReselection-CAG indicator indicated in SIB1. That is, in case that the intraFreqReselection-CAG indicator is allowed, the UE may perform cell reselection for other cells in a frequency (intra-frequency) to which the barred cell belongs.

In operation 2d-40, the UE may camp on a cell supporting CAG.

In operation 2d-45, the UE may perform cell reselection based on the system information received from the camped-on cell. Here, the system information may separately include a frequency priority for CAG and a frequency priority for non-CAG. The UE may perform cell reselection by applying a frequency priority for CAG. For example, the UE may perform cell reselection by applying the frequency priority for CAG included in SIB2 to cells in a frequency (intra-frequency) to which the camped-on cell belongs, and may perform cell reselection by applying the frequency priority for CAG included in SIB4 to cells in a frequency (inter-frequency) different from that of the camped-on cell.

Figure 2E:
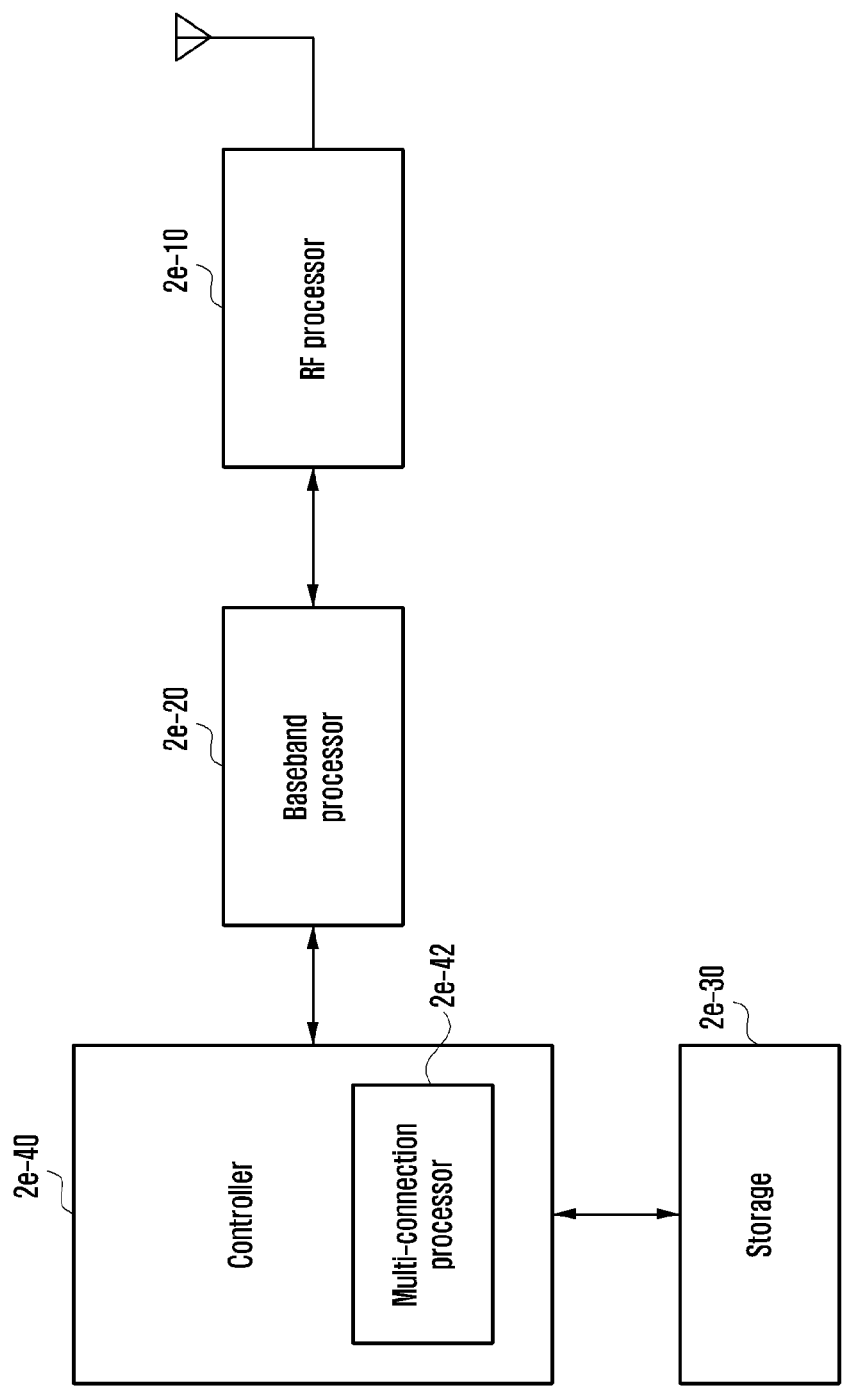
FIG. 2E is a block diagram showing the internal structure of a UE according to an embodiment of the disclosure.

FIG. 2E is a block diagram showing the internal structure of a UE according to an embodiment of the disclosure.

Referring to FIG. 2E, the UE may include a radio frequency (RF) processor 2e-10, a baseband processor 2e-20, a storage 2e-30, and a controller 2e-40. The controller 2e-40 may further include a multi-connection processor 2e-42.

The RF processor 2e-10 may perform a function of transmitting or receiving a signal through a radio channel, such as band conversion and amplification of a signal. That is, the RF processor 2e-10 may up-convert a baseband signal provided from the baseband processor 2e-20 to an RF band signal and then transmit the same through an antenna, and may down-convert an RF band signal received through the antenna to a baseband signal. For example, the RF processor 2e-10 may include a transmission filter, a reception filter, an amplifier, a mixer, an oscillator, a digital-to-analog converter (DAC), an analog-to-digital converter (ADC), and the like. Although only one antenna is illustrated in FIG. 2E, this is only an example, and the UE may include a plurality of antennas. In addition, the RF processor 2e-10 may include a plurality of RF chains. Further, the RF processor 2e-10 may perform beamforming. To perform beamforming, the RF processor 2e-10 may adjust the phases and magnitudes of respective signals transmitted and received through a plurality of antennas or antenna elements. In addition, the RF processor 2e-10 may perform MIMO, and may receive multiple layers in case that performing the MIMO operation.

The baseband processor 2e-20 may perform a function of conversion between a baseband signal and a bit string according to the physical layer specification of the system. For example, in case that transmitting data, the baseband processor 2e-20 may encode and modulate transmission bit strings, thereby generating complex symbols. In addition, in case that receiving data, the baseband processor 2e-20 may reconstruct reception bit strings by demodulating and decoding a baseband signal provided from the RF processor 2e-10. For example, in case that the radio access technology follows an orthogonal frequency division multiplexing (OFDM) scheme, in case that transmitting data, the baseband processor 2e-20 may generate complex symbols by encoding and modulating transmission bit strings, may map the complex symbols to subcarriers, and then may configure OFDM symbols through an inverse fast Fourier transform (IFFT) operation and cyclic prefix (CP) insertion. In addition, in case that receiving data, the baseband processor 2e-20 may divide the baseband signal provided from the RF processor 2e-10 into OFDM symbol units, may reconstruct the signals mapped to the subcarriers through a fast Fourier transform (FFT) operation, and then may reconstruct reception bit strings through demodulation and decoding.

The baseband processor 2e-20 and the RF processor 2e-10 may transmit or receive signals as described above. Accordingly, the baseband processor 2e-20 and the RF processor 2e-10 may be referred to as a "transmitter", a "receiver", a "transceiver", or a "communication unit". Further, at least one of the baseband processor 2e-20 and the RF processor 2e-10 may include a plurality of communication modules in order to support a plurality of different radio access techniques. In addition, at least one of the baseband processor 2e-20 and the RF processor 2e-10 may include different communication modules to process signals in different frequency bands. For example, the different radio access techniques may include a wireless LAN (e.g., IEEE 802.11), a cellular network (e.g., LTE), and the like. In addition, the different frequency bands may include super-high frequency (SHF) (e.g., 2 NRHz or NRhz) bands or millimeter wave (e.g., 60 GHz) bands.

The storage 2e-30 may store data such as fundamental programs, application programs, and configuration information for the operation of the UE. In addition, the storage 2e-30 may provide the stored data in response to a request from the controller 2e-40.

The controller 2e-40 may control the overall operation of the UE. For example, the controller 2e-40 may transmit or receive signals through the baseband processor 2e-20 and the RF processor 2e-10. In addition, the controller 2e-40 records and reads data in and from the storage 2e-30. To this end, the controller 2e-40 may include at least one processor. For example, the controller 2e-40 may include a communication processor (CP) for controlling communication and an application processor (AP) for controlling upper layers such as application programs. In addition, the controller 2e-40 may control cell selection and cell reselection operations of the UE according to various embodiments of the disclosure.

Figure 2F:
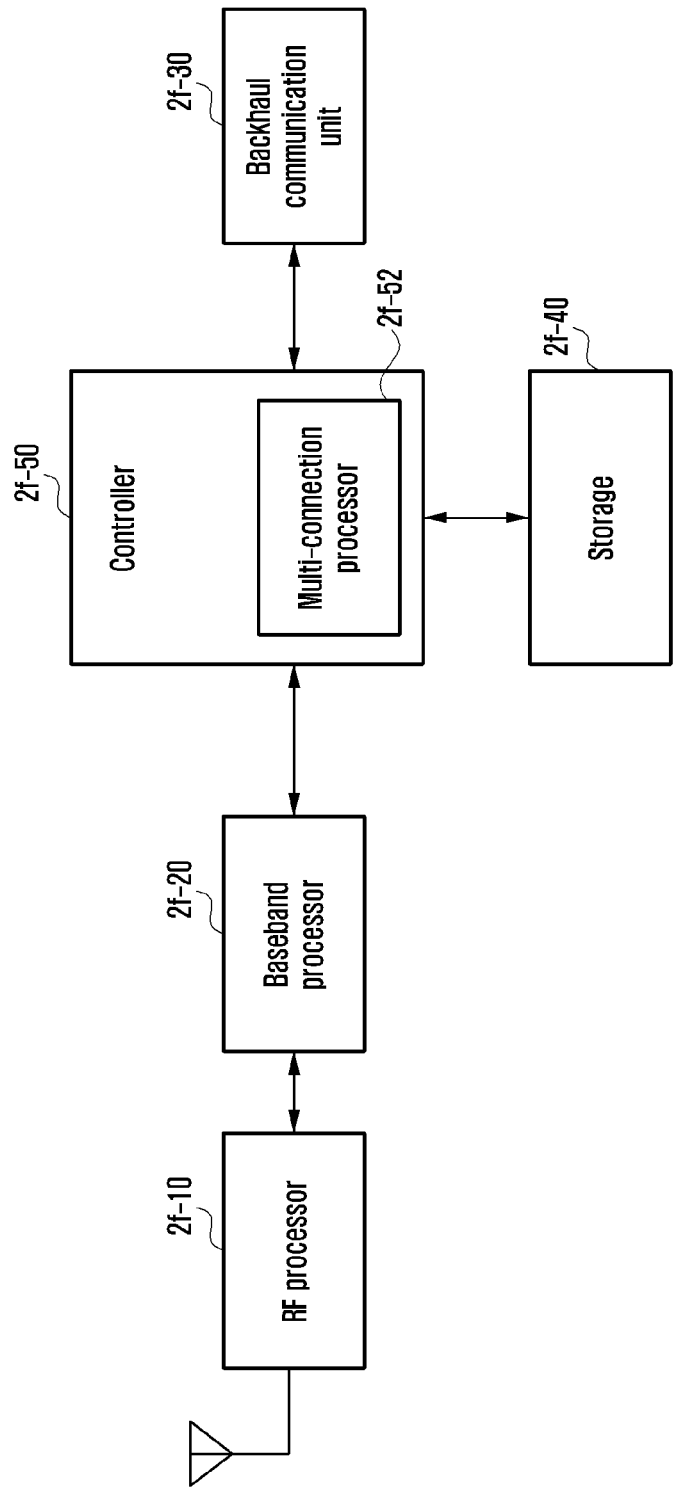
FIG. 2F is a block diagram showing the configuration of an NR base station according to an embodiment of the disclosure.

FIG. 2F is a block diagram showing the configuration of a base station according to an embodiment of the disclosure.

As shown in FIG. 2F, the base station may include an RF processor 2f-10, a baseband processor 2f-20, a backhaul communication unit 2f-30, a storage 2f-40, and a controller 2f-50. The controller 2f-50 may further include a multi-connection processor 2f-52.

The RF processor 2f-10 may perform a function of transmitting or receiving a signal through a radio channel, such as band conversion and amplification of a signal. That is, the RF processor 2f-10 may up-convert a baseband signal provided from the baseband processor 2f-20 to an RF band signal and then transmit the same through an antenna, and may down-convert an RF band signal received through the antenna to a baseband signal. For example, the RF processor 2f-10 may include a transmission filter, a reception filter, an amplifier, a mixer, an oscillator, a digital-to-analog converter (DAC), an analog-to-digital converter (ADC), and the like. Although only one antenna is illustrated in FIG. 2F, the base station may include a plurality of antennas. In addition, the RF processor 2f-10 may include a plurality of RF chains. Further, the RF processor 2f-10 may perform beamforming. To perform beamforming, the RF processor 2f-10 may adjust the phases and magnitudes of respective signals transmitted and received through a plurality of antennas or antenna elements. The RF processor 2f-10 may perform downlink MIMO operation by transmitting one or more layers.

The baseband processor 2f-20 may perform a function of conversion between a baseband signal and a bit string according to the physical layer specification of the first radio access technology. For example, in case that transmitting data, the baseband processor 2f-20 may generate complex symbols by encoding and modulating transmission bit strings. In addition, in case that receiving data, the baseband processor 2f-20 may reconstruct reception bit strings by demodulating and decoding a baseband signal provided from the RF processor 2f-10. For example, in case that the radio access technology follows an orthogonal frequency division multiplexing (OFDM) scheme, in case that transmitting data, the baseband processor, the baseband processor 2f-20 may generate complex symbols by encoding and modulating transmission bit strings, may map the complex symbols to subcarriers, and then may configure OFDM symbols through an IFFT operation and CP insertion. In addition, in case that receiving data, the baseband processor 2f-20 may divide the baseband signal provided from the RF processor 2f-10 into OFDM symbol units, may reconstruct the signals mapped to the subcarriers through a fast Fourier transform (FFT) operation, and then may reconstruct reception bit strings from the reconstructed signals through demodulation and decoding. The baseband processor 2f-20 and the RF processor 2f-10 may transmit or receive signals as described above. Accordingly, the baseband processor 2f-20 and the RF processor 2f-10 may be referred to as a "transmitter", a "receiver", a "transceiver", a "communication unit", or a "wireless communication unit".

The backhaul communication unit 2f-30 may provide an interface for communicating with other nodes in the network. That is, the backhaul communication unit 2f-30 may convert a bit string transmitted from a main base station to another node, for example, an auxiliary base station, a core network, etc. into a physical signal, and may convert the physical signal received from the other node into a bit string.

The storage 2f-40 may store data such as a basic program, an application program, and configuration information for the operation of the main base station. In particular, the storage 2f-40 may store information on a bearer assigned to an accessed UE, a measurement result reported from the accessed UE, and the like. In addition, the storage 2f-40 may store information serving as a criterion for determining whether to provide or stop multiple connections to the UE. In addition, the storage 2f-40 may provide the stored data according to the request of the controller 2f-50.

The controller 2f-50 may control overall operations of the base station. For example, the controller 2f-50 may transmit or receive signals through the baseband processor 2f-20 and the RF processor 2f-10 or through the backhaul communication unit 2f-30. In addition, the controller 2f-50 may record data in the storage 2f-40, and may read data from the storage 2f-40. To this end, the controller 2f-50 may include at least one processor. The controller 2f-50 may control the operation of the base station according to various embodiments of the disclosure, and may perform signaling to control the operation for cell selection and cell reselection of the UE.

The methods according to various embodiments described in the claims or the specification of the disclosure may be implemented by hardware, software, or a combination of hardware and software.

In case that the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

The invention claimed is:

1. A method for operating a UE in a wireless communication system, the method comprising:
receiving, from a base station of a first radio access technology (RAT) supporting a new radio (NR), a mobility-related message for a handover to a second RAT supporting an evolved-universal mobile telecommunication system (UMTS) terrestrial radio access (E-UTRA), the mobility-related message including an indicator associated with an inter-RAT mobility;
identifying whether the handover from the first RAT to the second RAT has failed;
in response to a failure of the handover, selecting a cell of the second RAT and determining not to perform a cell selection to the first RAT; and
after selecting the cell of the second RAT, performing operation in a radio resource control (RRC) idle mode in the selected cell of the second RAT.

2. The method of claim 1,
wherein, based on a reception of the mobility-related message for the handover:
in case that a T390 timer is running, the T390 timer is stopped for all access categories, and
in case that a target RAT type indicates the EUTRA, a non-access stratum (NAS) security parameter configuration information is forwarded to an upper layer.

3. The method of claim 1, wherein the indicator is related to an evolved packet service (EPS) fallback for supporting an IP multimedia subsystem (IMS) service.

4. The method of claim 1,
wherein the mobility-related message for the handover is a mobility from NR command message, and
wherein the mobility-related message for the handover further includes at least one of an indicator indicating a target RAT type, a target RAT message container, or non-access stratum (NAS) security parameter configuration information.

5. The method of claim 1,
wherein in case that the failure occurs based on that the UE is unable to comply with any part of configuration included in the mobility-related message or there is a protocol error in inter RAT information included in the mobility-related message, a procedure of re-establishing a connection to the first RAT is performed.

6. A method for operating a source base station of a first radio access technology (RAT) supporting a new radio (NR) in a wireless communication system, the method comprising:
initiating a handover procedure related to an evolved packet service (EPS) fallback for supporting an IP multimedia subsystem (IMS) service; and
transmitting, to a UE, a mobility-related message for the handover to a second RAT supporting an evolved-universal mobile telecommunication system (UMTS) terrestrial radio access (E-UTRA), the mobility-related message including an indicator associated with an inter-RAT mobility,
wherein, in response to a failure of the handover, a cell of the second RAT is selected and a cell selection to the first RAT is determined not to be performed, and
wherein, after the cell of the second RAT is selected, operation in a radio resource control (RRC) idle mode in the selected cell of the second RAT are performed.

7. The method of claim 6, wherein the indicator is related to the EPS fallback for supporting the IMS service, and
wherein, based on a reception of the mobility-related message for the handover:
in case that a T390 timer is running, the T390 timer is stopped for all access categories, and
in case that a target RAT type indicates the EUTRA, a non-access stratum (NAS) security parameter configuration information is forwarded to an upper layer.

8. The method of claim 6,
wherein the mobility-related message for the handover is a mobility from NR command message, and
wherein the mobility-related message for the handover includes at least one of an indicator indicating a target RAT type, a target RAT message container, or non-access stratum (NAS) security parameter configuration information.

9. The method of claim 6,
wherein, in case that the cell of the second RAT is not selected, a procedure of re-establishing a connection to the source base station is performed.

10. The method of claim 6,
wherein in case that the failure occurs based on that the UE is unable to comply with any part of configuration included in the mobility-related message or there is a protocol error in inter RAT information included in the mobility-related message, a procedure of re-establishing a connection to the first RAT is performed.

11. A UE of a wireless communication system, the UE comprising:
a transceiver; and
at least one processor configured to:
receive, from a base station of a first radio access technology (RAT) supporting a new radio (NR), a mobility-related message for a handover to a second RAT supporting an evolved-universal mobile telecommunication system (UMTS) terrestrial radio access (E-UTRA), the mobility-related message including an indicator associated with an inter-RAT mobility, identify whether the handover from the first RAT to the second RAT has failed, in response to a failure of the handove, selecting a cell of the second RAT and determining not to perform a cell selection to the first RAT, and after selecting the cell of the second RAT, performing operation in a radio resource control (RRC) idle mode in the selected cell of the second RAT.

12. The UE of claim 11, wherein, based on a reception of the mobility-related message for the handover:
  in case that a T390 timer is running, the T390 timer is stopped for all access categories, and
  in case that a target RAT type indicates the EUTRA, a non-access stratum (NAS) security parameter configuration information is forwarded to an upper layer.

13. The UE of claim 11, wherein the indicator is related to an evolved packet service (EPS) fallback for supporting an IP multimedia subsystem (IMS) service.

14. The UE of claim 11, wherein the mobility-related message for the handover is a mobility from NR command message, and wherein the mobility-related message for the handover further includes at least one of an indicator indicating a target RAT type, a target RAT message container, or non-access stratum (NAS) security parameter configuration information.

15. The UE of claim 11, wherein in case that the failure occurs based on that the UE is unable to comply with any part of configuration included in the mobility-related message or there is a protocol error in inter RAT information included in the mobility-related message, a procedure of re-establishing a connection to the first RAT is performed.

16. A source base station of a first radio access technology (RAT) supporting a new radio (NR) in a wireless communication system, the source base station comprising:

a transceiver; and
at least one processor configured to:
  initiate a handover procedure related to an evolved packet service (EPS) fallback for supporting an IP multimedia subsystem (IMS) service, and
  transmit, to a UE, a mobility-related message for the handover to a second RAT supporting an evolved-universal mobile telecommunication system (UMTS) terrestrial radio access (E-UTRA), the mobility-related message including an indicator associated with an inter-RAT mobility, wherein, in response to a failure of the handover, a cell of the second RAT is selected and a cell selection to the first RAT is determined not to be performed, and wherein, after the cell of the second RAT is selected, operation in a radio resource control (RRC) idle mode in the selected cell of the second RAT are performed.

17. The source base station of claim 16, wherein the indicator is related to the EPS fallback for supporting the IMS service, wherein, based on a reception of the mobility-related message for the handover:
  in case that a T390 timer is running, the T390 timer is stopped for all access categories, and
  in case that a target RAT type indicates the EUTRA, a non-access stratum (NAS) security parameter configuration information is forwarded to an upper layer.

18. The source base station of claim 16, wherein the mobility-related message for the handover is a mobility from NR command message, wherein the mobility-related message for the handover includes at least one of an indicator indicating a target RAT type, a target RAT message container, or non-access stratum (NAS) security parameter configuration information, and wherein, in case that the cell of the second RAT is not selected, a procedure of re-establishing a connection to the source base station is performed.

19. The source base station of claim 16, wherein in case that the failure occurs based on that the UE is unable to comply with any part of configuration included in the mobility-related message or there is a protocol error in inter RAT information included in the mobility-related message, a procedure of re-establishing a connection to the first RAT is performed.

* * * * *